(12) United States Patent
Zhang

(10) Patent No.: US 12,392,932 B2
(45) Date of Patent: Aug. 19, 2025

(54) ULTRALOW EMITTANCE METASURFACE THERMAL RADIATION BARRIERS

(71) Applicant: University of North Texas, Denton, TX (US)

(72) Inventor: Zihao Richard Zhang, Denton, TX (US)

(73) Assignee: University of North Texas, Denton, TX (US)

( * ) Notice: Subject to any disclaimer, the term of this patent is extended or adjusted under 35 U.S.C. 154(b) by 111 days.

(21) Appl. No.: 18/222,439

(22) Filed: Jul. 15, 2023

(65) Prior Publication Data
US 2024/0019604 A1    Jan. 18, 2024

Related U.S. Application Data

(60) Provisional application No. 63/389,768, filed on Jul. 15, 2022.

(51) Int. Cl.
*B32B 15/04* (2006.01)
*B32B 17/06* (2006.01)
*G02B 1/10* (2015.01)

(52) U.S. Cl.
CPC ................................. *G02B 1/10* (2013.01)

(58) Field of Classification Search
CPC ....................................................... G02B 1/10
USPC ....................................................... 428/702
See application file for complete search history.

(56) References Cited

U.S. PATENT DOCUMENTS

| 5,907,189 A | 5/1999 | Mertol |
| 6,281,141 B1 | 8/2001 | Das et al. |
| 7,691,452 B1 | 4/2010 | Wong |
| 8,299,606 B2 | 10/2012 | Mori et al. |
| 8,488,646 B2 | 7/2013 | Chang-Hasnain et al. |
| 8,765,360 B2 | 7/2014 | Wang et al. |
| 9,482,789 B2 | 11/2016 | Kim et al. |
| 9,625,620 B2 | 4/2017 | Beinat et al. |
| 10,253,984 B2 | 4/2019 | Pearson et al. |
| 10,287,207 B2 | 5/2019 | Melcher et al. |
| 2006/0012882 A1* | 1/2006 | Shang ............... G02B 5/288 359/586 |
| 2006/0246625 A1 | 11/2006 | Terui et al. |
| 2008/0206470 A1 | 8/2008 | Thomas et al. |

(Continued)

FOREIGN PATENT DOCUMENTS

| JP | 5506678 B2 | 5/2014 |
| JP | 6293064 B2 | 3/2018 |
| KR | 101855091 B1 | 5/2018 |

*Primary Examiner* — Lauren R Colgan
(74) *Attorney, Agent, or Firm* — Norton Rose Fulbright US LLP

(57) ABSTRACT

A monolithic dielectric coating composed of microscale periodic high-contrast gratings on multilayers of high and low refractive index optical materials is described, which is deposited on metal thin-films of flexible polymer insulation sheeting. The emittance can be minimized to any blackbody temperature, using parameter optimization of high-contrast grating phase-shift mode conditions. The high-low refractive index infrared-transparent multilayer is based on Fabry-Pérot cavity, but with non-quarter-wave thicknesses to achieve multilayer insulation conductance below that of metal films. This ultralow emittance coating is most relevant to thermal management of refrigeration and electronic components.

16 Claims, 15 Drawing Sheets

(56) References Cited

U.S. PATENT DOCUMENTS

2017/0010482 A1* 1/2017 Mathai .................... G02F 1/017
2018/0217395 A1 8/2018 Lin et al.

* cited by examiner

ULTRALOW EMITTANCE METASURFACE THERMAL RADIATION BARRIERS

CROSS-REFERENCE TO RELATED APPLICATIONS

The present application claims the benefit of priority from U.S. Provisional Application No. 63/389,768 filed Jul. 15, 2022 and entitled "ULTRALOW EMITTANCE THERMAL RADIATION BARRIER ACHIEVED BY A HIGH-CONTRAST GRATING COATING," the disclosure of which is incorporated by reference herein in its entirety.

TECHNICAL FIELD

The present application is directed to thermal radiation insulation barriers and more specifically to photonic high-contrast grating metasurface ultralow emittance thermal radiation barriers and coatings.

BACKGROUND

Thermal radiative coupling between surfaces is minimized with metallic coatings or thin films. These radiation sheet barriers are used in various thermal management applications, such as spacecraft "space blankets," refrigeration component insulation, household climate control, and many others. The effective conductance of layered metallized blankets, called multilayer insulation (MLI), is minimized with more layers and a vacuum environment. The mechanism that allows thermal de-coupling is due to low photonic emittance (high reflectance) surfaces. Traditionally, these surfaces consist of submicron-thin physical vapor deposited metals, as their electrical conductance results in field cancellation from external electromagnetic waves. Transition metals such as aluminum, copper, gold, silver, and others are free electron-dense, resulting in high plasma frequency, as described by the Drude free electron damping model.

With the aforementioned metals, the low energy gap between oxidation states combined with the metal bond lattice ductility makes them susceptible to degradation of optical properties, which can limit the useful life of the radiation sheet barrier material. Thickness-dependent formation of surface oxidization and defects can increase infrared emittance by severalfold, while typical sub-micron root-mean-square roughening can increase visible to near-infrared wavelength absorptivity from solar radiation. In spaceflight environments, the optical properties of coatings quickly degrade over the first two years due to surface pitting from outgassing, micrometeoroids or debris, high energy particle radiation, and atomic oxygen in low Earth orbit. To resist mechanical and optical degradation of these metal films on flexible polymer substrates, manufacturers apply micron-thick surface finishes such as silica, indium tin oxide, germanium, and transparent polymers.

SUMMARY

Embodiments of the present disclosure support the manufacture and use of thermal radiation barriers having surface finishes that increase the useful life of and enhance the thermal radiation properties of the thermal radiation barriers. The disclosed radiation barriers include surface finishes having a scalable micro-patterned optical coating that both reduces susceptibility to physical degradation and enhances infrared thermal radiative performance.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF DRAWINGS

For a more complete understanding of the present disclosure, reference is now made to the following descriptions taken in conjunction with the accompanying drawings, in which.

Figure 1:
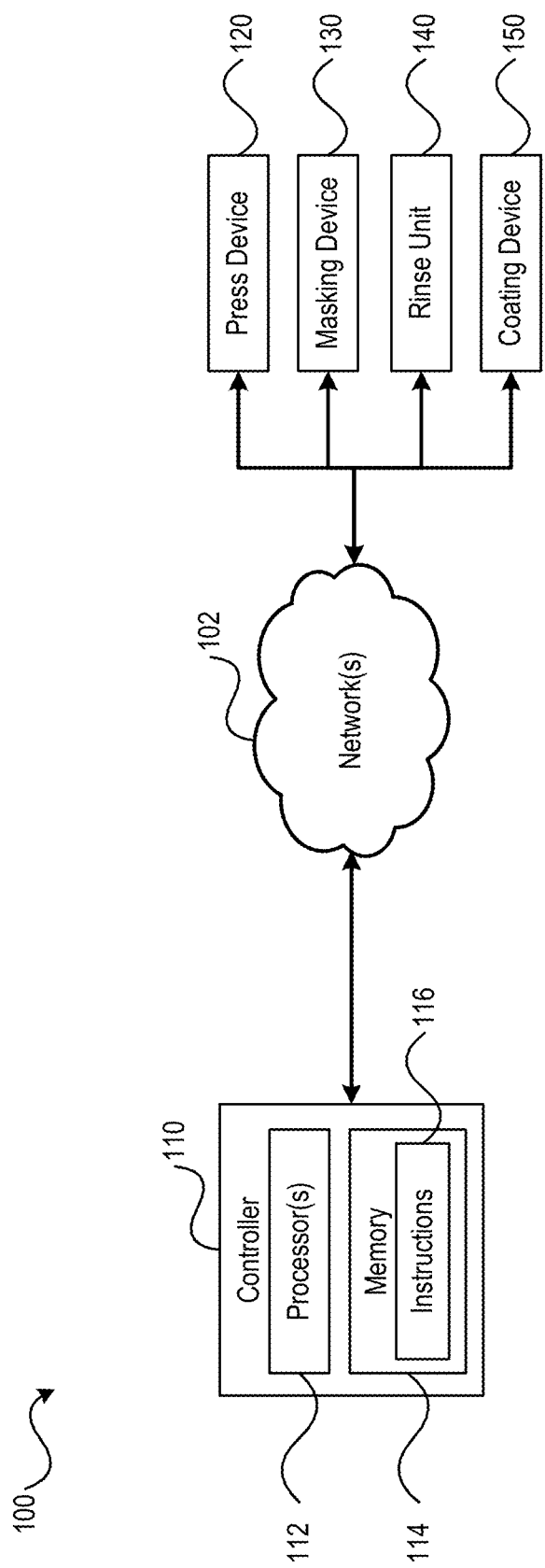
FIG. 1 shows a block diagram of a system for manufacturing thermal radiation barriers in accordance with aspects of the present disclosure.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Several mechanisms can achieve high reflectance without a plain metal mirror. One mechanism is Fabry-Pérot interferometry, which produces near-perfect resonant reflection and transmission by designing appropriate transparent material thicknesses and refractive index contrast. Fabry-Pérot cavities typically contain a low refractive index transparent insulator cavity layer surrounded by high refractive index thin film boundaries. The Fabry-Pérot interference quality is additive—a very large numbers of periods of cavity quarter-wave multilayers can enable perfect transmission or reflectance.

The second and somewhat similar mechanism is the high-contrast grating (HCG), a periodically-patterned microstructured metasurface that acts as a phase shift mode waveguide. This unique type of grating design has originally been applied to mirrors in vertical cavity surface emitting lasers (VCSELs). HCG can obtain high quality broadband reflectance exceeding 0.99 at normal incidence by the virtue of high refractive index structures having period or duty cycle comparable to wavelength surrounded by a low index medium, typically vacuum. Monolithic HCG constructions on optical thin films have also been used in electromechanical tunable mirrors, optical resonators and switches, thermal emitters, and more.

There are also non-radiative means to provide ultralow thermal transport: Aerogel, a high-temperature resilient nanoporous silica, can achieve thermal conductance as low as 8 mW/mK. Boron nitride embedded gel polymers could maintain low thermal conductance in a high temperature condition, outperforming sole polymer substrates. However, mixed-phase gas effective medium foams, slabs, and paints must address outgassing between atmospheric and vacuum pressures, thereby creating vacancies and tears in films.

To achieve high reflectance without a plain metal mirror, embodiments of the present disclosure may leverage Fabry-Pérot interferometry to produce near-perfect resonant reflection and transmission. The system may be configured to enable a user to design appropriate transparent material thicknesses and refractive index contrast to optimize the Fabry-Pérot layer(s) and achieve desired properties, as described in more detail below. The Fabry-Pérot layers may include cavities containing a low refractive index transparent insulator cavity layer surrounded by high refractive index thin film boundaries. In aspects, the additive properties of Fabry-Pérot interference may be leveraged, allowing a number of periods of cavity quarter-wave multilayers to be utilized to enable perfect transmission or reflectance. In some aspects fewer layers may be utilized to achieve a complimentary resonant mechanism that, while not providing perfect transmission or reflectance, provides improved transmission or reflectance as compared to a single Fabry-Pérot layer or no Fabry-Pérot layer, which may reduce or minimize a thickness of a monolithic coating in accordance with the concepts described herein.

To realize a more effective thermal insulation, a high-contrast grating (HCG), such as a periodically-patterned microstructured metasurface may also be utilized to enhance the FP layer. The HCG acts as a phase shift mode waveguide to provide high quality broadband reflectance exceeding 0.99 at normal incidence by the virtue of high refractive index structures having a period or a duty cycle comparable to the wavelength surrounded by a low index medium, as described in more detail below.

Referring to FIG. 1, a block diagram of a system for manufacturing thermal radiation barriers in accordance with aspects of the present disclosure is shown as a system 100. As shown in FIG. 1, the system 100 includes a controller device 110 having one or more processors 112 and a memory 114. The memory 114 may store instructions 116 that, when executed by the processor(s) 112, cause the processor(s) 112 to perform operations for controlling manufacturing processes that may be used to produce thermal radiation barriers and other materials in accordance with aspects of the present disclosure. The manufacturing processes performed under the control of the controller device 110 may include a press device 120, a masking device 130, a rinsing unit 140, a coating device 150, a combination of these devices, and/or other devices. In an aspect, the various devices 120-150 may be controlled by the controller 110 via commands transmitted to the various devices 120-150 over a network 102.

To achieve high reflectance without a plain metal mirror, embodiments of the present disclosure may leverage Fabry-Pérot (FP) interferometry, which produces near-perfect resonant reflection and transmission. The system 100 may be configured to enable a user to design appropriate transparent material thicknesses and refractive index contrast to optimize the Fabry-Pérot layer(s) and achieve desired properties, as described in more detail below. The Fabry-Pérot layers may include cavities containing a low refractive index transparent insulator cavity layer surrounded by high refractive index thin film boundaries. In aspects, the additive properties of Fabry-Pérot interference may be leveraged, allowing a number of periods of cavity quarter-wave multilayers to be utilized to enable perfect transmission or reflectance. However, in some aspects and the interest of minimizing thickness of a monolithic coating, fewer layers may be utilized to achieve a complimentary resonant mechanism that, while not providing perfect transmission or reflectance, provides improved transmission or reflectance as compared to a single FP layer or no FP layer.

To realize a more effective thermal insulation, a high-contrast grating (HCG), such as a periodically-patterned microstructured metasurface may also be utilized to enhance the Fabry-Pérot layer. The HCG acts as a phase shift mode waveguide to provide high quality broadband reflectance exceeding 0.99 at normal incidence by the virtue of high refractive index structures having a period or a duty cycle comparable to the wavelength surrounded by a low index medium, as described in more detail below with reference to FIGS. 2A, 2B.

Figure 11:
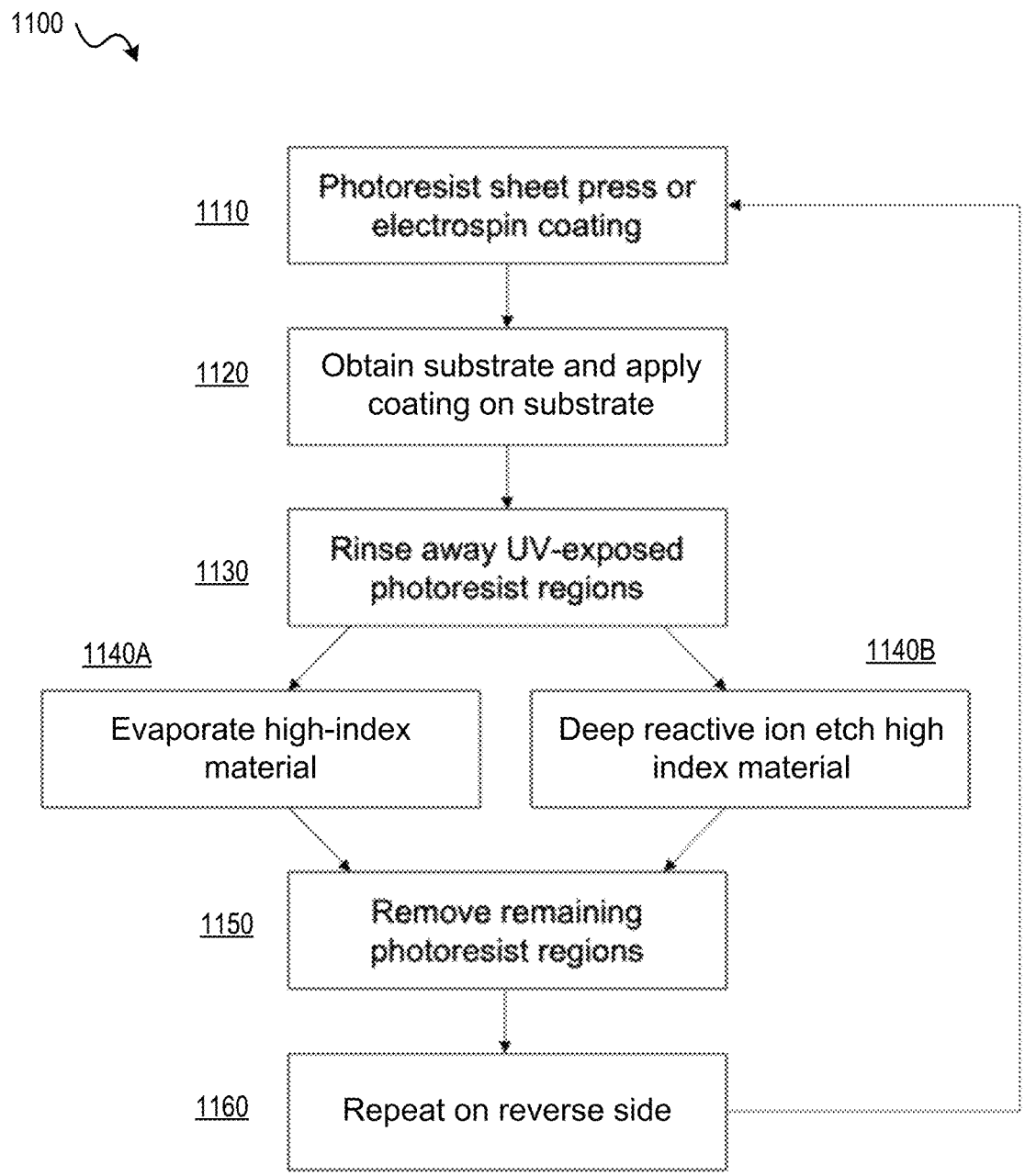
FIG. 11 shows a flow diagram illustrating exemplary operations of the system 100 for manufacturing thermal radiation barriers in accordance with aspects of the present disclosure.

Referring to FIG. 11, a flow diagram is shown illustrating exemplary operations of the system 100 for manufacturing thermal radiation barriers in accordance with aspects of the present disclosure, referred to herein as a method 1100. As explained above, the method 1100 may be performed by a system, such as the system 100 of FIG. 1. The method 1100 may start with obtaining a substrate, such as a metal sheet, and applying a coating on the substrate, at step 1110. In an aspect, the substrate may include the base layer 240 and layers 256, 258 described below with reference to FIG. 2B, which may be manufactured or preproduced in large scale. The coating may be a photoresist or electrospin coating and may be applied by the press device 120 of FIG. 1 (e.g., a photoresist press or other device). At step 1120, a mask may be applied to create a pattern in the coating. The mask may be applied using the masking device 130 of FIG. 1, such as a device for performing ultraviolet mask photolithography, however, other types of masking techniques may also be used. The photomask blocks electromagnetic radiation in the negative top-down pattern. The positive top-down pattern may be the exposed areas of the photoresist. At step 1130, the exposed areas are removed by rinsing, washing, physical lift-off, etc. The removal of portions of the coating may be achieved by rinsing the coated substrate using the rinsing unit 140 of FIG. 1. At step 1140, layer 252 in FIG. 2B may be produced by two parallel methods, shown as elements 1140A and 1140B. The material comprising layer 254 is deposited onto the photoresist and removed photoresist areas. Alternatively, material comprising layer 254 and the photoresist may be removed in the vertical direction from layer using chemical etching or mechanical milling. Photoresist may remain after vertical direction removal. In an aspect, the high index material of the layer 254 may be applied by the coating device 150 of FIG. 1, such as a sputtering device, a chemical vapor deposition device, or other types of coating devices. Following application of the high index material, a second rinsing step may be performed, at step 1150, wherein any remaining portions of the coating applied in step 110 are removed, leaving only the high index material applied at step 1140, resulting in formation of the functional thermal radiation barrier structure 250 of FIG. 2B. At step 1160, steps 1110-1150 may be repeated for multiple substrates and/or for multiple surfaces of a single substrate (e.g., a top and bottom surface of the substrate). Exemplary illustrations of the results of the method 1100 are described in more detail below with reference to FIGS. 2A and 2B.

It has been recognized that non-radiative means to provide ultralow thermal transport, such as aerogel, a nanoporous silica, can achieve thermal conductance as low as 8 mW/mK. A boron nitride nanotube embedded polymer gel could maintain low thermal conductance in a high temperature condition, outperforming sole polymer substrates. However, a big weakness with a mixed-phase gas effective medium foams, slabs, and paints is their outgassing between atmospheric and vacuum pressures, creating vacancies and tears in films. While recent interest in sustainable, renewable, and bio-inspired building insulation materials have surfaced to address materials impact on terrestrial environment and climate, their endurance and performance in demanding environments have yet to be assessed. In the present disclosure, materials and pattern designs are described that can obtain lower infrared radiative emittance than pristine metal. A survey of existing thin film coating materials assesses the suitability of their thermal insulative performance. With a set of ideal materials, a study of both Fabry-Pérot and HCG optical mechanisms for achieving near-perfect reflectance are also discussed. Variations in coating designs at corresponding temperature conditions and integration into multilayers are evaluated for effective conductance performance in vacuum. Using the system 100 and method 1100, as well as the exemplary techniques and structural features described below with reference to FIGS. 2A and 2B, a perfect infrared mirror may be designed that is tailorable for various radiative insulation conditions and environments. The concept of a protective coating exceeding the reflectance of the existing metal thin-film substrate could also impact the engineering of compact and resilient spacecraft architectures, building insulation and fire protection, and cryogenic device thermal management.

Figure 2A:
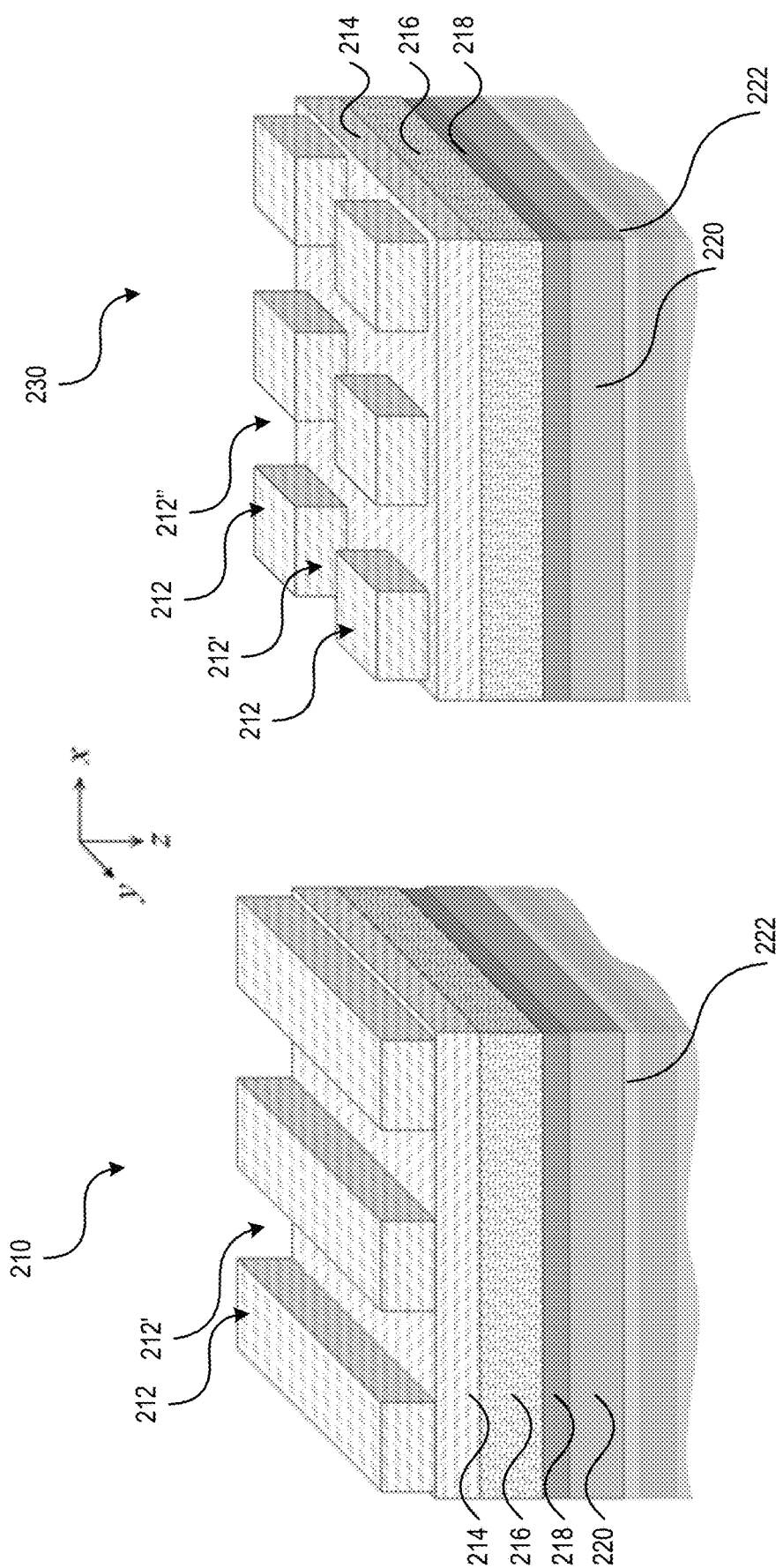
FIGS. 2A and 2B show images illustrating aspects of thermal radiation barriers in accordance with the present disclosure.
Figure 2B:
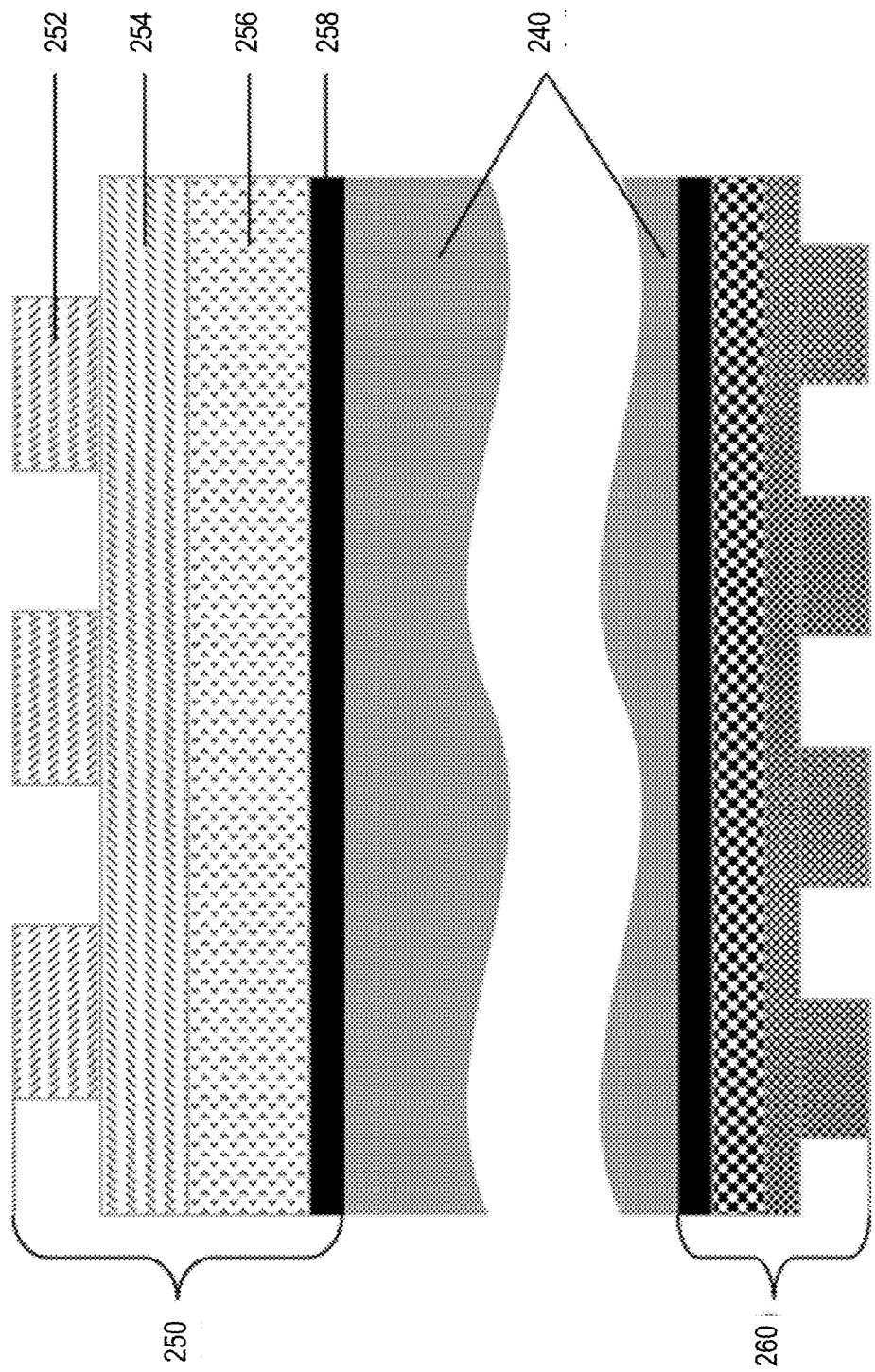

To further illustrate the concepts described above with reference to FIGS. 1 and 11, considerations with respect to materials selection, optical properties, and calculation of radiative properties of both Fabry-Pérot multilayers and periodic gratings will now be described. Referring to FIGS. 2A and 2B, images illustrating exemplary aspects of thermal radiation barriers in accordance with the present disclosure are shown. Referring to FIG. 2B, a cross-sectional diagram of a thermal radiation barrier in accordance with the present disclosure is shown. In FIG. 2B, feature 240 represents a base of the radiation barrier, which supports the functional structure 250. The base 240 may be solid and mechanically supportive of the functional structure 250. The base 240 can be formed of a flexible material, such as a polymer, to allow bending and forming around shapes. The base 240 can be extruded and mechanically compliant without affecting the performance of the functional structure 250.

As shown in FIG. 2B, the functional thermal radiation barrier structure 250 and the functional thermal radiation barrier structure 260 may be disposed on surfaces on different opposing surfaces of the base 240, wherein the functional thermal radiation barrier structure 260 may have a structure similar to or the same as that of functional thermal radiation barrier structure 250. It is noted that dimensions (e.g., length, width, height, etc.) of the base 240 may vary depending on the particular configuration of the radiation barrier and the application to which it may be applied.

As shown in FIG. 2B, functional thermal radiation barrier structure 250 may be composed of different layers 252, 254, 256, 258. Layer 258 may be formed as a layer of metal, which is both electrically and thermally conductive. Exemplary metals that may be used to form the layer 258 may include aluminum, gold, silver, titanium, and others. In an aspect, the metal layer is at least optically thin. For example, a minimum thickness of the layer 258 may follow the optical penetration depth rule of $\lambda/2\pi\kappa$, meaning the layer 258 is opaque or optically non-transparent. $\lambda$ is the optical wavelength and $\kappa$ is the optical absorption coefficient of the material used to form the layer 258. For aluminum, a thickness of 100 nm and more for the layer 258 may be sufficient to be optically opaque.

Layer 256 may be a layer of non-conducting solid that is optically transparent. The layer 256 may have an absorption coefficient $\kappa$ at the wavelength of interest $\lambda$ that is small, near negligible. For example, the coefficient $\kappa$ may be no more than $\lambda/2\pi d$, where $\delta$ is the thickness or vertical dimension of layer 256. The layer 256 may be formed from various materials such as oxides, fluorides, undoped semiconductors, polymers, or combinations thereof.

The layers 252, 254 may be layers of a non-conducting material having a higher refractive index than layers 256, 258. Like layer 256, the optical absorption coefficient of layers 252, 254 may be configured to be as small as possible. Layer 254 may be a solid layer having a thickness that is less than layer 256. Layer 252 may be a patterned layer formed of the same material as layer 254. The patterning may be periodic in the lateral (horizontal) direction, where the raised features have a duty cycle or periodicity. The number of raised features, called gratings, may be sufficient to cover the broad coating area or coherent optical beam size. For example, the area coverage of gratings may surpass a 10 μm by 10 μm region for the coating at room temperature or 25° C. Materials used to form layers 252, 254 can include various oxides, fluorides, undoped semiconductors, polymers, or combinations thereof, which may be the same as or different from the materials used to form the layer 256.

Table 1, below, identifies elements and chemistries that describe non-limiting examples of possible compositions for the base 240 and the layers 252, 254, 256, 258 shown in FIG.

2B. Material compositions correspond to: aluminum (Al), barium fluoride (BaF$_2$), calcium fluoride (CaF$_2$), copper (Cu), germanium (Ge), gold (Au), hafnia (HfO$_2$), potassium bromide (KBr), silicon (Si), silver (Ag), silicon (Si), silica (SiO$_2$), and tantalum oxide (Ta$_2$O$_5$). Substrate Feature (1) materials Kapton™, Mylar™, and Teflon™ are trademarked commercial names for polyimide, biaxially-oriented polyethylene terephthalate, and polytetrafluoroethylene, respectively. The categorizations of visible/near-infrared and mid-infrared/far-infrared correspond to blackbody emission wavelengths of λ=0.3 to 2.4 μm, and λ=5.0-35 μm, respectively. It is noted that other elements and chemistries may also be utilized to form the various layers of a radiant barrier in accordance with aspects of the present disclosure.

TABLE 1

Materials targeting visible to near/short-infrared, and mid- to far-infrared wavelengths for flexible barrier bases

| | Visible to Near-IR (0.3-2.4 μm) | Mid- to Far-IR (5.0-35 μm) |
|---|---|---|
| High-Index (Layers 252, 254) | HfO$_2$, Ta$_2$O$_5$ | Ge, Si |
| Low-Index (Layer 256) | SiO$_2$, CaF$_2$ | BaF$_2$, KBr |
| Metal (Layer 258) | Al, Cu | Al, Ag, Au |
| Substrate (Base 240) | Kapton™, Mylar™, Teflon™ | |

Referring to FIG. 2A, perspective views of thermal radiation barriers having patterned gratings are shown. As shown in FIG. 2A, the periodic gratings can be patterned laterally in a one-dimensional pattern, as illustrated by thermal radiation barrier 210 on the left side of FIG. 2A, or two-dimensional pattern, as illustrated by thermal radiation barrier 230 on the right side of FIG. 2A. The thermal radiation barrier 210 includes a layer 214, which may be the same as layer 254 of FIG. 2B. Layer 216 may be a Fabry-Pérot cavity layer formed from a low refractive index material, as described above with reference to layer 256 of FIG. 2B. A layer 218 may be formed as a thin metal film, typically no more than a few hundred nanometers thick, as described above with reference to layer 258 of FIG. 2B. A structural substrate 220 similar to the base layer 240 of FIG. 2B can be provided and may be formed from a polymer or other materials to allow flexibility.

The thermal radiation barrier 230 is similarly formed as multi-layer structure including a high index layer 214, a low index layer 216, a metal layer 218, and a base layer 220. The metal and polymer layers 218, 220 correspond to layers traditionally found in thermal radiation barriers, such as space blankets, while the high and low index layers 214, 216 form a Fabry-Pérot layer incorporated into the thermal radiation barrier in accordance with the concepts disclosed herein. In an aspect, a reverse side 222 of the thermal radiation barriers 210, 230 may be scaled to minimize emissive coupling.

In an aspect, the thermal radiation barriers 210, 230 include an HCG layer formed on a surface of the Fabry-Pérot layer. For example, the Fabry-Pérot layer of the thermal radiation barriers 210 includes a one-dimensional HCG having a plurality of grating features 212, shown as ridges separated by valleys or channels 212'. Similarly, the Fabry-Pérot layer of the thermal radiation barriers 230 includes a two-dimensional HCG layer having a plurality of grating features 212, shown as pillars separated by valleys or channels 212' and 212". It is noted that incorporating an HCG layer may be optional. It is noted that thermal radiation barrier 210 distinguishes the non-conducting material and vacuum or free space (air) only on a single horizontal axis, such as a (y) axis running parallel to the gaps 212' between the grating features 212 of the thermal radiation barrier 210. Similarly, the thermal radiation barrier 230 distinguishes the non-conducting material and free space on two horizontal axes, such as the (y) axis running parallel to the gaps 212" and the (x) axis running parallel to the gaps 212'. In an aspect, the duty cycle can be either the same or different between the two axes. The area coverage of both axes must surpass the coherent optical beam size or total coating area.

It is noted that while FIG. 2A shows the structural features of a thermal radiation barrier in accordance with the present disclosure as including grating features shown as ridges or pillars, such features have been provided for purposes of illustration, rather than by way of limitation and that thermal radiation barriers of the present disclosure may include other types of grating features or multiple grating features (e.g., a combination of ridges, pillars, and/or other structures). Furthermore, thermal radiation barriers in accordance with the present disclosure may include other types of HCG structures other than the ridges and/or pillars if desired. Additionally, a thermal radiation barrier in accordance with the present disclosure may utilize multiple thermal radiation barriers 210, 230 in a stacked configuration to create multi-sheet thermal radiation barriers, each sheet having a set of layers like those shown in FIG. 2B.

It is noted that the HCG layer of the thermal radiation barriers 210, 230 may have a period A corresponding distance between a start of one grating feature 212 and a start of an adjacent grating feature 212, a width w corresponding to a width of the grating features 212, and a height h corresponding to a height of the grating features 212 from the upper surface of the layer 214. Similarly, the HCG layer of the thermal radiation barrier 230 may have a second width w' (e.g., because of the free space or air in both the x and y directions), where w and w' may be the same or different. Each of the layers 214, 216, 218, 220 may have a thickness d. The refractive indices of the materials or layers may be similar to the corresponding layers of FIG. 2B described above.

In selecting materials for forming the various layers and components of the thermal radiation barriers according to the present disclosure, optical and other properties of the materials may be considered. For the coating (e.g., the Fabry-Pérot layer), the imaginary component or absorption coefficient of the refractive index should be minimal for the wavelength range of interest. To minimize absorption from solar irradiation or emission from high temperature blackbodies via Kirchhoff's Law of Radiation, a dielectric or insulator must have near-zero imaginary component of the refractive index (K) in the visible spectrum (λ=0.4-0.7 μm) and up to the near/short-infrared (λ=0.7-3 μm). To minimize emission from terrestrial or room temperature bodies, the transparency region is between λ=3 μm and beyond 30 μm, the mid- to far-infrared range may be of interest. For cryogenic and sub-Kelvin bodies, the transparency region in the wavelength of interest may be complicated as it could lie in the microwave (λ>1000 μm). On the other hand, materials to be used for the metal substrate (e.g., layer 218) are less varied and less rigorous. Consideration for metals is rather on its high plasma frequency (ω) dependency in the short wavelength UV-visible range spectrum, where aluminum (15 eV) exceeds that of gold, silver, and copper (7-9 eV). Additionally, appropriate environmental conditions on these metals must also be weighted or considered. The structural polymer material type (e.g., base layer 220) is mostly dictated by mechanical strength and stability in operating temperatures—the polymer may participate in radiative exchange in single-side coated or multi-side coated sheets.

Table 1 (above) outlines some candidate dielectrics, metals, and polymer materials that may be used to form thermal radiative barriers in accordance with aspects of the present disclosure. The thermal radiative barriers may be suitable for use under high temperature applications, as well as use cases involving room temperature conditions. The visible to near-infrared range can be considered for minimizing solar absorptivity ($\alpha$). For high index dielectrics having transparency windows from 300 nm up to 10 µm, hafnium oxide ($HfO_2$) and tantalum pentoxide ($Ta_2O_5$) have near-constant refractive indices n=1.9 and n=2.1, respectively. These heavy transition metal oxides present interband electron resonance, resulting in broad Lorentz high-K absorption peaks centered around the mid- and far-infrared. The more ubiquitous silicon dioxide ($SiO_2$) or quartz crystal is a low refractive index material with n=1.5 from the visible wavelengths up to 7.5 µm. To reach a lower refractive index, mineral fluorides may provide good alternatives. For example, calcium fluoride ($CaF_2$) has transparency up to around 19 µm, with refractive index around n=1.4. Metal thin film with high free electron density, such as aluminum (Al) and possibly copper (Cu), may be utilized in use cases where frequencies beyond plasma oscillations lying in the extreme UV may be involved. Lastly, the polymer material (e.g., the layer 220 or 240) can vary among Kapton (polyimide), Mylar (BoPET), and Teflon (PTFE). Orange-colored Kapton is thermally stable, but presents the highest natural absorptance and emittance due to its multitude of broad and narrow phonon absorption peaks in the infrared. Clear Mylar presents better optical properties, but degrades under the sun. Teflon is similar to Kapton in its infrared emittance and has better transparency under solar spectrum—Teflon is used as a spacecraft optical solar reflector (OSR), but its temperature tolerance window (−200° C. to +260° C.) is narrower than Kapton's (−269° C. to +400° C.). As can be appreciated from the above, the various optical and other properties (e.g., infrared emittance, temperature tolerance, etc.) present tradeoffs that may be utilized to design and manufacture thermal radiation barriers in accordance with the concepts described herein according to the particular use case to which the barriers are to be utilized.

As an exemplary and non-limiting example, consider a use case targeting radiative insulation for applications involving room temperature conditions. In such applications, a high-refractive index dielectric can be either germanium (Ge) or silicon (Si). Germanium has the highest refractive index of n=4.0 through all infrared wavelengths, but is absorbing at wavelengths below 1 µm. Germanium crystal structure is face-centered cubic (FCC) and can be amorphous with little change to electron band function, but Ge becomes conductive above 350 K as thermal electrons enter the band gap. Undoped Si has a slightly lower refractive index of n=3.4, from the visible to far-infrared. For the low-index dielectric materials, the candidate pool becomes limited as bound electron absorption of oxides occur in the mid- to far-infrared. $CaF_2$ also becomes too absorbing, where its Reststrahlen peak or Lorentz resonance is centered near 40 µm. Heavy mineral fluorides also with n=1.5, such as barium fluoride ($BaF_2$), have their Reststrahlen peak centered near 50 µm. Another class of infrared transparent dielectrics is heavier halogen salts, such as bromides.

Cubic potassium bromide (KBr) has been used in infrared-transparent glasses, as its Reststrahlen peak lies beyond 70 µm and its infrared refractive index just slightly higher at n=1.55. In a case study of low emittance coating design for room temperature conditions, Ge and KBr may be selected for their offering of highest refractive index contrast as well as transparency in the broad infrared wavelengths matching the Planck blackbody function at 300 K.

From the material survey described above, a comparison of the effect of imperfect or degraded metallized thin film on spectral solar absorptance and infrared emittance can be conducted. A model may then be generated to compare spectra of preexisting protective thin film coating solutions used in metallized blankets or other forms of thermal radiation barriers or sheets. The spectral normal absorptance is designated by $\alpha_{n,\lambda}$ and the spectral normal emittance by $\varepsilon_{n,\lambda}$. At normal incidence from vacuum and through a layer of thickness $d_1$ having complex refractive index $n_1$ on an opaque large-index metal, the thin film equation can be approximated by:

$$\alpha_{n,\lambda}, \varepsilon_{n,\lambda} = 1 - \left| \frac{(1-n) - (1+n)e^{4i\pi d n_1/\lambda}}{(1+n_1) - (1-n_1)e^{4i\pi n d_1/\lambda}} \right|, \quad \text{Equation (1)}$$

For a film with zero $\kappa_1$, and therefore no decay term, $\alpha_{n,\lambda}$ and $\varepsilon_{n,\lambda}$ are zero. But with an attenuating thin film with non-zero $\kappa_1$, Equation (1) becomes more complicated. To illustrate and referring to FIG. 3, diagrams illustrating solar absorptance, infrared emittance, and absorptance of flat aluminum covered with an aluminum oxide film are shown. The film includes a 20 nm-thick aluminum oxide ($Al_2O_3$) film having a typical dielectric function under exposure to atmospheric conditions. Compared to bare aluminum, the infrared emittance uniformly increases by roughly 0.02, but oxidation does not greatly affect absorptance from visible and near-infrared light. Using normal incidence surface roughness scattering reflectance coefficient factor ($S_{r,n}$) for a 20 nm root-mean-square ($\delta_{rms}$), the term inside the absolute brackets in Equation (1) can be modified according to:

$$S_{r,n} = e^{-8\pi^2 \delta_{rms}^2 n_m^2/\lambda^2} \quad \text{Equation (2)}$$

Figure 3:
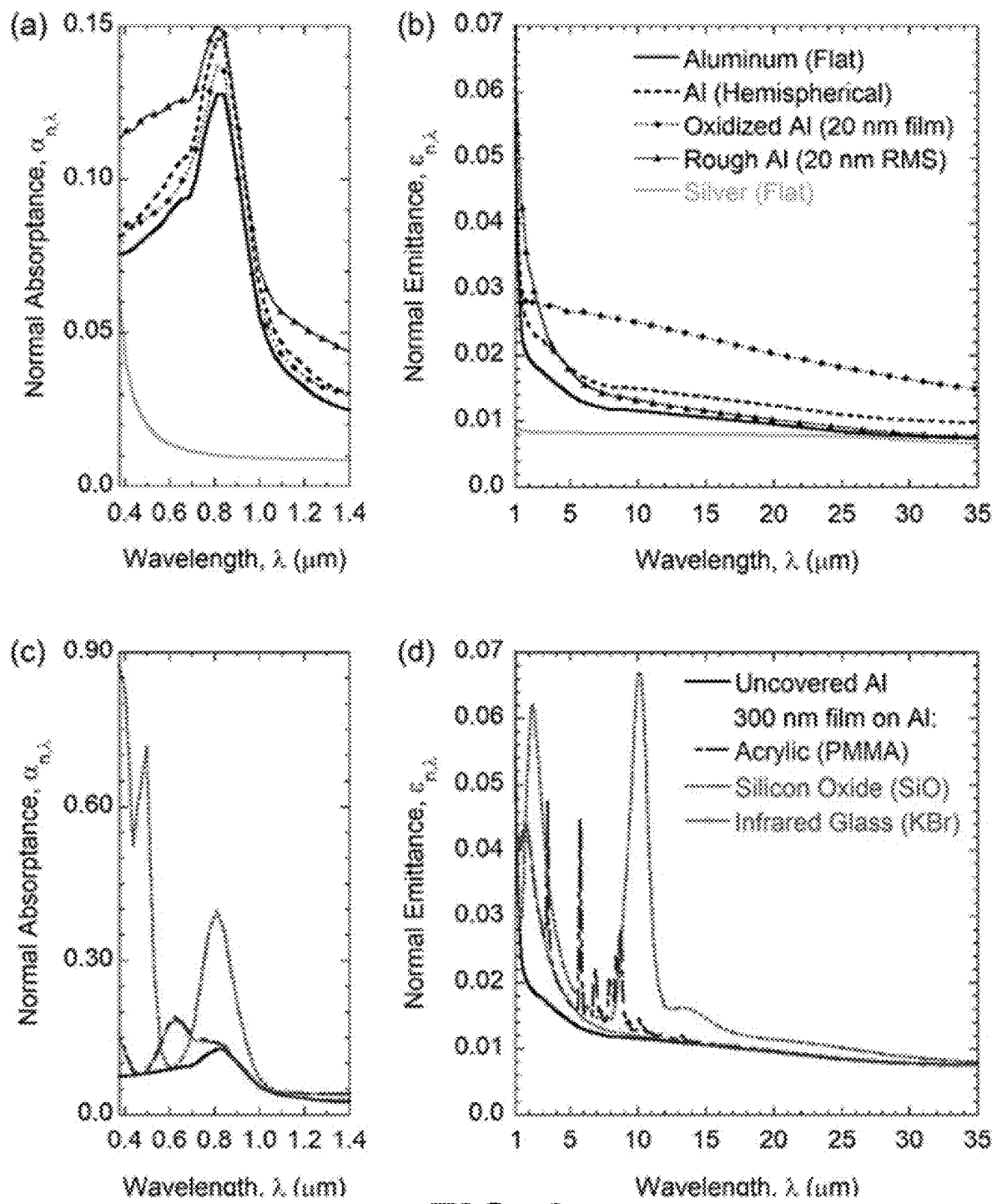
FIG. 3 shows diagrams illustrating solar absorptance, infrared emittance, and absorptance of flat aluminum covered with an aluminum oxide film.

In FIG. 3, panel (a) shows the solar absorptance, panel (b) shows the infrared emittance spectra of bare aluminum (Al) and silver (Ag), and the effects after Al oxidation and surface roughness, and the absorptance and emittance spectra of 300 nm thick protective films made of acrylic (PMMA), silicon oxide (SiO), and a proposed infrared glass such as barium fluoride or potassium bromide on flat pure Al are shown in panels (c) and (d), respectively. As can be appreciated from the diagrams of FIG. 3, due to its $\lambda^{-2}$ scaling, the surface roughness effects are more prominent in the short wavelengths. This is observed in the increase in absorptance in visible radiation wavelengths below 0.7 µm. Therefore, the presence of both a metal surface protective and non-oxide coating can critically improve radiative insulative performance. Silver has better reflectance, but due to its higher susceptibility to atmospheric and thermal tarnish or corrosion, requires a protective finish to improve longevity.

It is noted that protective coatings can offer both degradation protection and electrostatic discharge (ESD) buildup mitigation. For example, a polymer coating such as Acrylic (PMMA) on the metal side only offers the former. PMMA, like all the polymer structural substrates, has many narrow-band long-chain phonon absorption modes. To illustrate, the spectral emittance from a 300 nm-thick PMMA on aluminum may show many peaks in the mid- and far-infrared, and minimal increase in absorptance in the visible wavelength range. Silicon oxide (SiO), which is slightly more favorable than $SiO_2$ due to its slightly narrower Lorentz absorption centered around $\lambda_0=10$ μm, drastically increases infrared emittance. However, SiO is typically selected to prevent mechanical burnishing. In consideration of the materials presented in Table 1, application of a 300 nm-thick layer of KBr with dielectric function from Palik may minimally affect the infrared emittance. This layer of infrared-transparent coating presents similar absorptance and emittance spectra as PMMA polymer, but without the narrow absorptance peaks. While not shown in panel (d) of FIG. 3, a 300 nm-thick layer of vacuum-deposited Ge defined by Amotchkina and Porter on aluminum demonstrates high emittance due to its high refractive index, and high absorptance due to its phonons. A layer of Ge around 50 nm or thinner can reduce its constructive interference in the infrared. However, different thicknesses of such layers may impact the emittance properties of the sheet or barrier. Exemplary considerations that may be used to determine appropriate thicknesses to minimize emittance using infrared glasses KBr and Ge are described in more detail below.

Rigorous Coupled-Wave Analysis (RCWA) is used to obtain the optical properties and electromagnetic field of the periodic structures. The RCWA formulations are derived from Fourier expanded wave equations. The electric (EGr) and magnetic (HGr) fields in the simple grating shown in the uppermost layer in FIGS. 2A and 2B can be calculated by the Fourier expansion of the space harmonic field terms according to:

$$E_{Gr} = \Sigma_j E_j(z) \exp(ik_x, jx) \quad \text{Equation (3a)}$$

$$H_{Gr} = i\sqrt{\frac{\varepsilon_0}{\mu_0}} \Sigma_j H_j(z)\exp(ik_x, jx) \quad \text{Equation (3b)}$$

where $E_j$ and $H_j$ are the amplitudes of the space-harmonic component fields of diffraction orders $j=0, \pm1, \pm2, \ldots, \pm N$. For cases involving a 1D grating (e.g., the grating 212 of FIG. 2A) RCWA, the order number is N=19, which is more than adequate for far-field radiative properties of non-plasmonic gratings. In Equations (3a) and (3b), $k_{x,j}$ is the lateral wavevector, decomposed into $k_{x,j}=2\pi \sin \partial/\lambda + 2\pi j/\Lambda$.

Equations (3a) and (3b) can also be substituted into the coupled-wave system of equations, given by:

$$\Sigma_j \left[\frac{1}{k_0^2}\frac{\partial^2 E_j}{\partial z^2} - \frac{k_{x,j}^2}{k_0^2}E_j + \Sigma_o n_{j-p}^2(x)E_p\right] = 0 \quad \text{Equation (4)}$$

where the refractive index in the grating region is expanded into a Fourier series such that $n_{j-p}=0$ when j=p [54, 55]. This coupled-wave equation can be expressed in a $(2N+1)\times(2N+1)$ matrix, solved by using the boundary conditions at the surface (z=0) for the electric field and tangential component of the magnetic field at the interface between incident and grating region, as well as the grating and the substrate. Additionally, $E_j$ can be expressed with a large number of reflected mode eigenvalues ($q_m$) and eigenvectors ($v_m$) with forward and backward propagating wave coefficients $A_{j,m}$ and $B_{j,m}$, respectively. The grating diffraction-order dependent reflection $r_j$ and transmission coefficients $t_j$ can then be solved in matrix operations using:

$$r_j+r_0=\Sigma_{m=0}^{\infty} w_{j,m}[A_{j,m}+B_{j,m} \exp(-k_0 q_m d)] \quad \text{Equation (5a)}$$

$$t_j=\Sigma_{m=0}^{\infty} w_{j,m}[A_{j,m} \exp(-k_0 q_m d)-B_{j,m}] \quad \text{Equation (5b)}$$

where $r_0=1$ for j=0, and $r_0=0$ for $j\neq 0$.

The overall reflectance and transmittance can be obtained from calculating reflected and transmitted diffraction efficiencies defined as:

$$DE_{r,j} = r_j r_j * \text{Re}\left(\frac{k_{inc,j}}{k_0 \cos \theta}\right) \quad \text{Equation (6a)}$$

$$DE_{t,j} = t_j t_j * \text{Re}\left(\frac{k_{sub,j}}{k_0 \cos \theta}\right) \quad \text{Equation (6b)}$$

This system of equations obtains the reflectance $\rho_\lambda=\Sigma DE_{r,j}$ and transmittance $\tau_\lambda=\Sigma DE_{t,j}$, j by applying the same procedure to coupled $H_j$ waves. The spectral emittance is related via $\varepsilon_\lambda=1-\rho_\lambda-\tau_\lambda$.

For a 2D grating with patterning in both x and y directions (e.g., in the grating of the layer 252 of FIG. 2B), the azimuthal angle $\phi$ for both TE and TM wave may also be included. With diffraction orders of j for the x direction and l for they direction, the grating electromagnetic fields can be calculated using:

$$E_{Gr} = \Sigma_{j,l}\left[E_{x,jl}(z)\hat{i} + E_{y,jl}(z)\hat{j} + E_{z,jl}(z)\hat{k}\right]\exp[i(k_{x,j}x + k_{y,l}y + k_{z,jl}z)] \quad \text{Equation (7a)}$$

$$H_{Gr} = i\sqrt{\frac{\varepsilon_0}{\mu_0}} \Sigma_{j,l}(z)\hat{i} + H_{y,jl}(z)\hat{j} + H_{z,jl}(z)\hat{k}] \quad \text{Equation (7b)}$$

$$\exp[i(k_{x,j}x + k_{y,l}y + k_{z,jl}z)]$$

where the wavevector for the Bloch-Floquet condition-satisfying diffracted wave can be modified to $k_{x,j}=2\pi n_0 \sin \partial \cos \phi/\lambda + 2\pi j/\Lambda_x$ and $k_{y,l}=2\pi n_0 \sin \partial \sin \phi/\lambda + 2\pi l/\Lambda_y$, where $l=0, \pm1, \pm2, \ldots, \pm A$. The 2D RCWA becomes a much more time-consuming calculation due to differing 2N+1th versus 2M+1th terms representing x and y diffraction orders' matrix calculations, respectively.

The total normal emittance as a function of the spectral normal emittance is given by:

$$\varepsilon_n = \frac{\int_0^\infty \varepsilon_{n,\lambda}\Theta(\lambda, T)d\lambda}{\sigma T^4} \quad \text{Equation (8)}$$

where the Planck blackbody emissive power wavelength-temperature function is $\Theta(\lambda,T)=2hc^2/\lambda^5 (e^{hc_0/\lambda k_B T}-1)$, provided the universal thermophysical constants $c_0$, h, $k_B$, and $\sigma$. Note that the integration from a finite non-zero lower bound wavelength and non-infinity upper bound wavelength requires numerical integration of the denominator of Eq. (8), as $\varepsilon_{n,\lambda}=1$. The typical separation distance between insulation sheets is no less than 160 μm, provided by low-conductivity fabric mesh netting. Since this far-field radiative gap distance can be regarded as a unity radiative view factor between two infinite parallel surfaces, normal emittance between surfaces is prioritized.

The theories and principles of high reflectance may be used to understand and illustrate optical mechanisms of Fabry-Pérot interference and moded HCG reflectance of far-infrared transparent glasses, which may enable selection and understanding of materials suitable for applications targeting room temperature (T=300 K) blackbody emission.

In the following examples, Ge was chosen as the high refractive index crystal, and potassium bromide (KBr) as the low refractive index crystal. Pure and undoped Ge is transparent in the far-infrared and up to radio frequencies (RF), but is not transparent in the visible range.

Figure 4:
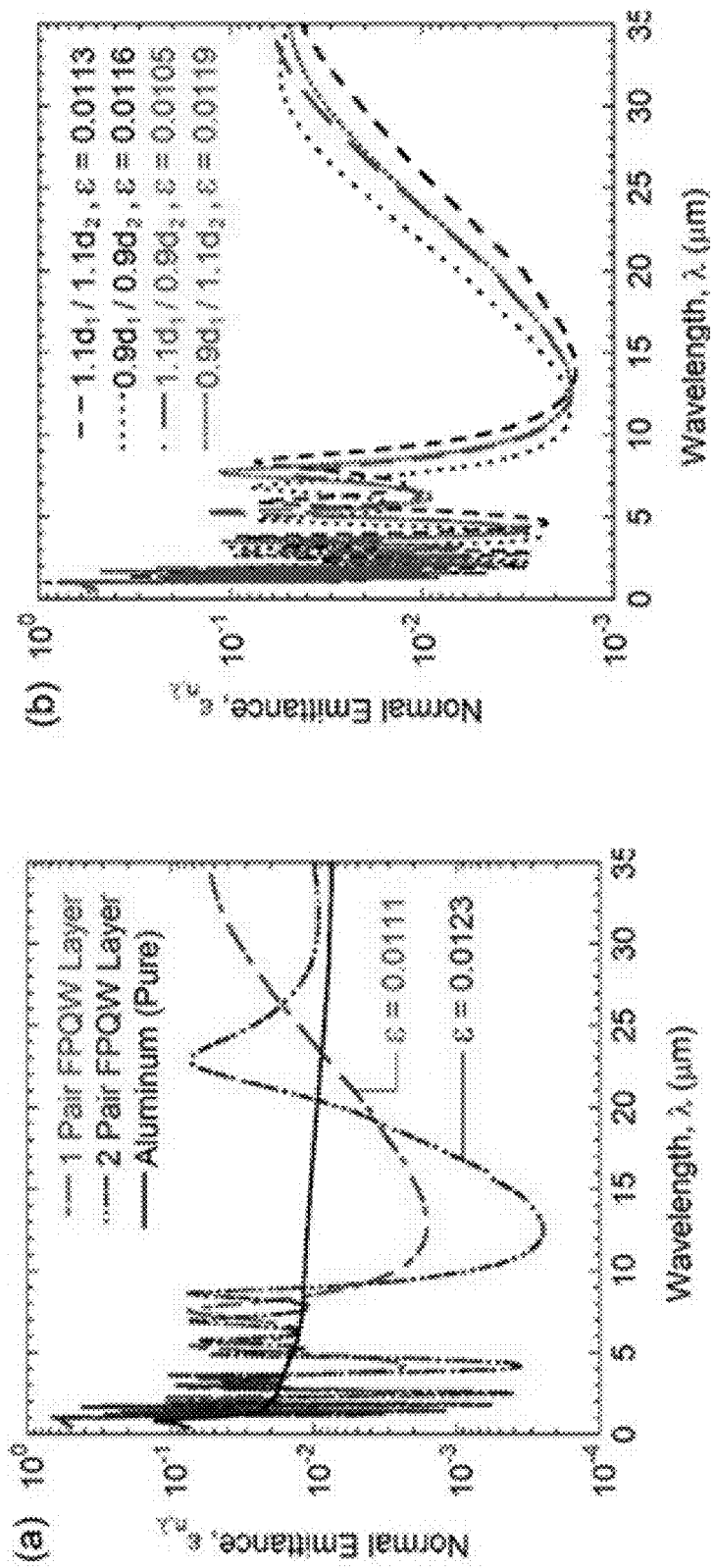
FIG. 4 illustrates exemplary high-quality reflectance properties for quarter-wave FP layers.

The simplest first-order structure to maximize reflectance is the Fabry-Pérot (FP) multilayer. The thicknesses that describe the FP are determined by the quarter-wave equation as a function of the layer's real part of the refractive index: $d=\lambda_0/4n$, where $\lambda_0$ is the center wavelength of maximum reflectance. Typically, this wavelength corresponds to the Wien displacement law with blackbody temperature, given by $\lambda_0$ (μm)=2898/T (K). The thickness of the FP cavity is determined by the half-mode phase shifts ($\psi$) at normal incidence, where $\psi=2\pi Re(n_i)/\lambda_0=0.57\pi, 1.57\pi, 2.57\pi, \ldots$ When integrating spectral normal emittance across the Planck spectrum for a T=300 K blackbody to obtain minimum total absorptance, the center wavelength may be higher than that determined by Wien displacement law. This is because the Planck emissive power at longer wavelengths is more prominent than the wavelengths below the function's peak, which may be applied in accordance with the concepts described herein as $\lambda_0=11.7$ μm. In FIG. 4, the high-quality reflectance maximization can be shown for one pair of FP quarter-wave layers: $d_1=0.74$ μm Ge above $d_2=1.593$ μm KBr. For this configuration, the lowest emittance $\varepsilon_{n,\lambda}=1.64\times 10^{-3}$ occurs at $\lambda=12.1$ μm. The calculated total normal emittance for a blackbody at 300 K is then $\varepsilon=0.011$, matching that of pure flat aluminum.

When applied with an identical second pair of FP layers above the first pair (i.e., in a multi-sheet configuration as described above with reference to FIG. 2B), the emittance is expected to further decrease. While this is true at the center wavelength, where the minimum is $\varepsilon_{n,\lambda}=2.5\times 10^{-4}$ at $\lambda=11.7$ μm, the surrounding spectrum has broad high emittance interference peaks. With this secondary layer, the total normal emittance at room temperature increases to $\varepsilon=0.012$. With more and more layers, the wavelength region around $\lambda_0$ becomes a Bragg reflector stop band between $\lambda/(d_1+d_2)$ =3.5 and 6.25. In the wavelength regions outside this stop band, the pass band, the oscillations become more frequent and higher magnitude with increasing layers due to thin film interference. Another factor for consideration is the thickness of the coating, as each FP pair can be, for example, 2.33 μm thick in this material configuration. As the thickness increases the use cases to which it may be applied may be impacted, both positively and negatively. To illustrate, a thicker material (e.g., barrier or sheet) may provide improved thermal insulative or emittance properties, but may be less pliable as non-limiting examples. Such characteristics or properties may be beneficial for some use cases while being inhibitive for other applications. Thus, the number of FP layers and the overall thickness of the material may be designed to provide particular properties or characteristics according to the use case to which the material is to be applied.

Referring to FIG. 4, plots showing the observed spectra for different FP layer thicknesses are shown. To test the consequence of slight imperfections in FP layer thicknesses and obtain the plots of FIG. 4, a material having one pair of FP layers was used, which is sufficient to achieve emittance below that of the metallic substrate. In the test material each layer was approximately 10% thicker and thinner than the designed quarter-wave thickness. The testing was conducted based on emittance spectra and total room temperature emittance of a single-period versus double-period Fabry-Pérot multilayer material, as shown in panel (a) of FIG. 4.

Panel (b) of FIG. 4 shows the spectral and total sensitivity from ±10% variation to single-period Fabry-Pérot layer thicknesses. In the test material the high-index layer was Ge, and the low-index layer was KBr. Each layer being 10% thicker has little effect on the total normal emittance, as the emittance minimum is slightly decreased and redshifted. The shifting of the multiple narrow interference fringes at wavelengths below this stop band contribute to the slight increase in total emittance. This effect is similar with 10% thinner layers, but in the opposite direction. The emittance peak in the far-infrared beyond 35 μm is now visible in the spectrum, which its integration weighted with Planck blackbody function increases the total emittance further. The last two variations are interestingly mixed. A thicker high index (Ge) layer and thinner low index (KBr) layer results in even lower total emittance. The stop band is unchanged from the perfect quarter-wave case, but the interference fringe magnitude just below this ($\lambda=7.1$ μm) is decreased. The emittance in the stop band is also preserved for the thinner Ge layer and thicker KBr layer, but a more prominent peak appears at the first interference fringe below the stop band. The last two configurations have interference fringe peaks exchange magnitudes in the pass band wavelengths between approximately 5 and 10 μm. While it can be said that the total thickness of the combination of FP near-quarter-wave layers may be the determining factor of emittance minima and maxima, the correlation is not quite linear. Generally, the greater contributing factor to phase shift is the lesser thickness of the interference cavity, since $\psi \propto d_2$.

It is noted that HCGs may be utilized in conjunction with the FP layer to achieve broadband near-perfect reflection without a metallic substrate. In such implementations the HCG material may be selected as Ge due to its highest non-metallic and zero-attenuation refractive index (n~4+0i) contrasting with air/vacuum or a low refractive index substrate in the broad infrared spectrum. Basic radiative properties of 1D HCGs may be calculated using Equations (3)-(6), while radiative properties of 2D HCGs can be calculated with Equation (7). The discussion below describes factors that may be used to optimize the HCG dimensions, which may include grating period $\Lambda$, grating height h, and grating filling ratio $f=w/\Lambda$.

Figure 5:
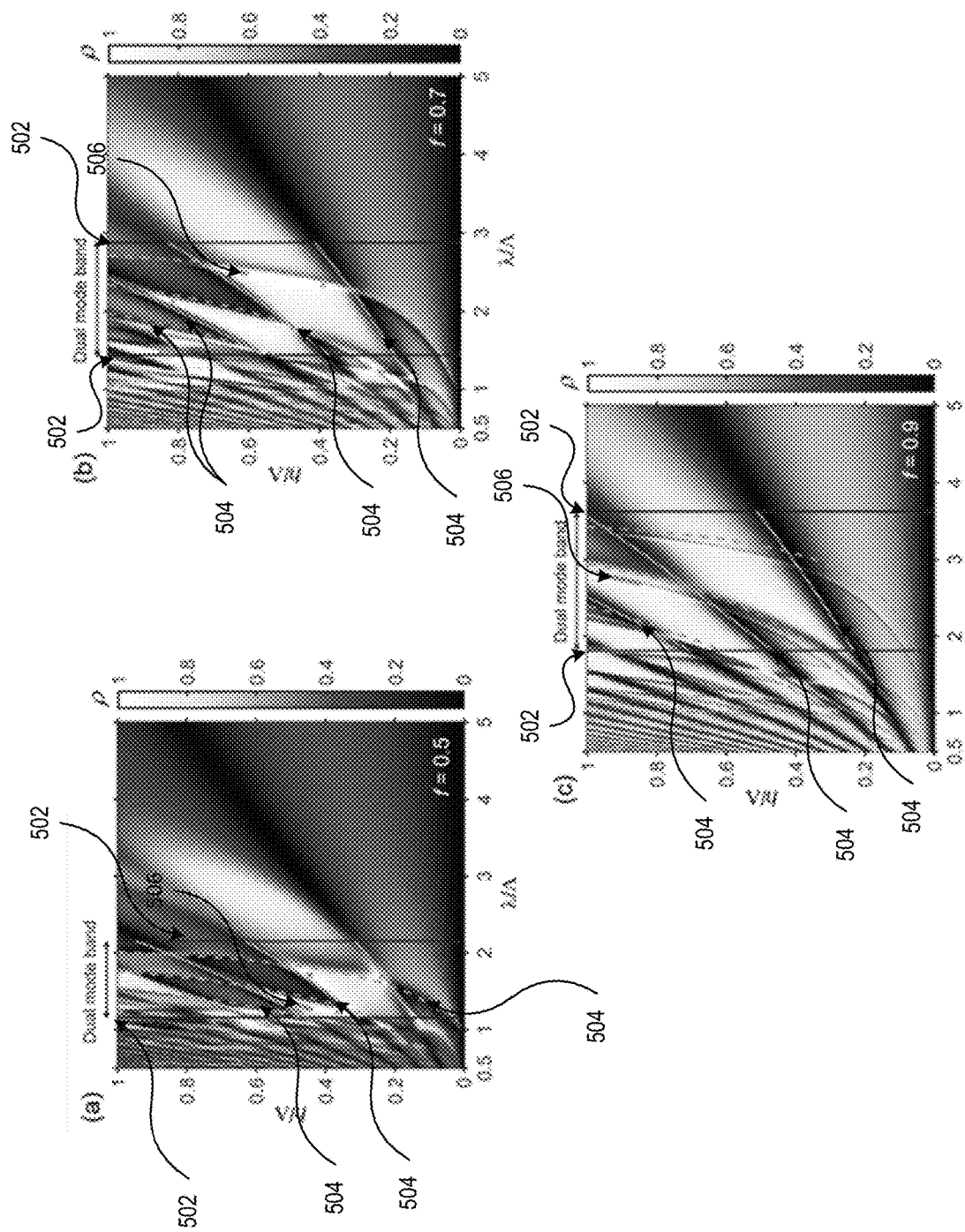
FIG. 5 shows contour plots for obtained parameterizations of both non-dimensionalized grating height and grating period with respect to wavelength spectrum.

Referring to FIG. 5, contour plots obtaining parameterizations of both non-dimensionalized grating height and grating period with respect to wavelength spectrum are shown. The reflectance contours are averaged over both TE-wave and TM-polarizations. Filling ratios were selected as f=0.5, f=0.7, and f=0.9 for standalone Ge HCG in panels (a), (b), and (c) of FIG. 5, respectively. The broadest reflectance maxima peaks occur within the HCG-characteristic dual mode band, outlined by the wavelength region bounded by blue lines. At non-dimensional wavelengths below the dual-band region ($\lambda \ll \Lambda$), the high number of interference fringes correspond to diffractive optics. To the right of this region ($\lambda \gg \Lambda$) the gratings are sub-wavelength and thusly becomes an effective medium. While naturally inclined to increase the filling ratio close to unity due to the increasing broadness of the dual mode band, the magnitude of reflectance decreases within the dual mode band. Increased filling ratio shows fewer marked maxima and where the HCG thickness tends toward the waveguide mode (h>$\Lambda$). This trade-off between the dual mode band broadness and the magnitude of maximum reflectance establishes that the best filling ratio is near f=0.7.

The high reflectance HCG resonance conditions occur using the following dispersion relation for TM-wave polarization:

$$k_{Gr,j} \tan\left(\frac{k_{Gr,j}f\Lambda}{2}\right) + n_{Gr}^2 k_{a,j} \tan\left[\frac{k_{a,j}(1-f)\Lambda}{2}\right] = 0 \quad \text{Equation (9)}$$

where the jth waveguide mode grating wavevector is given by $k_{Gr,j}^2 = n_{Gr}^2 k_0^2 - \beta_j^2$, and the air gap wavevector is given by $k_{a,j}^2 = k_0^2 - \beta_j^2$.

For TE polarization, Equation (9) may be modified by only setting $n_{Gr}=1$. The dual mode band cutoff wavelengths $\lambda_2$ and $\lambda_4$ enclosing the high reflectance regions are obtained by setting $\beta_2 = \beta_4 = 0$ and solving for Eq. (9). For example, for the f=0.7 case, $\lambda_2/\Lambda=2.88$ and $\lambda_4/\Lambda=1.44$. This consideration of the dual mode band width can help determine the HCG period needed to minimize blackbody emission. A 300 K blackbody, for example, would benefit from an HCG array of period near $\Lambda=4$ μm—obtained by the Wien displacement maximum to an approximate center wavelength between $\lambda_2$ and $\lambda_4$, i.e., $\Lambda=2.898/\lambda T$, where $\lambda \approx 2.5$ μm. This verifies that the characteristic HCG dimension $\Lambda$ may be optimally defined at infrared wavelength in some implementations or use cases.

In FIG. 5 the normal TE- and TM-polarization averaged reflectance spectra of period-normalized standalone Ge HCG height (h/Λ) are shown with varying filling ratios of f=0.5, f=0.7, and f=0.9 in panels (a), (b), and (c), respectively. The dual mode lines 502 outline the characteristic at-wavelength dual mode band high reflectance region, and the lines 504 show the first three $TM_0$ and $TE_2$ Fabry-Pérot waveguide modes of the HCG resonance condition dispersion. The local reflectance maxima exceeding $\rho > 0.999$ ($\varepsilon < 10^{-3}$) are shown at 506.

The Fabry-Pérot round-trip phase shift resonance dispersion lines 504 shown in FIG. 5 are for the first three phases ($\psi = 0$, $\pi$, and $2\pi$). The lines 504 include the first three $0^{th}$ waveguide mode $TM_0$ dispersions and for the 2nd waveguide mode $TE_2$ dispersions. $TM_0$ is the dispersion following the $\beta_0 = n_{Gr} k_0$ line, and $TE_2$ for the $\beta_2$-$\lambda_2$ second waveguide mode. The first three waveguide modes are outlined because they have the broadest regions of near-unity normal reflectance. In the smallest filling ratio case, f=0.5 in panel (a) of FIG. 5, the three waveguide modes collapse toward low h/Λ while the third $TE_2$ mode lies outside the dual mode band. This low filling ratio does not allow as much high reflectance across broad wavelengths. On the other hand, the high filling ratio (f=0.9) shows dispersions drift toward high h/Λ. Although this seems more promising toward broadband reflectance, the reflectance quality is reduced since the TM modes produce transmission, demonstrated by the broader near-zero reflectance near the $TM_0$ lines. The points enclosed within the upper waveguide modes are the only $\rho > 0.999$. Therefore, higher filling ratio HCGs may require taller gratings, attributed to deep groove waveguides. In the intermediate case (f=0.7), the broad reflectance enclosed in the waveguide modes demonstrate high quality reflectance ($\rho > 0.999$) throughout. Using such analysis, one can pinpoint the optimal HCG height, which in the example shown in FIG. 5 was close to h/Λ=0.5.

Figure 6:
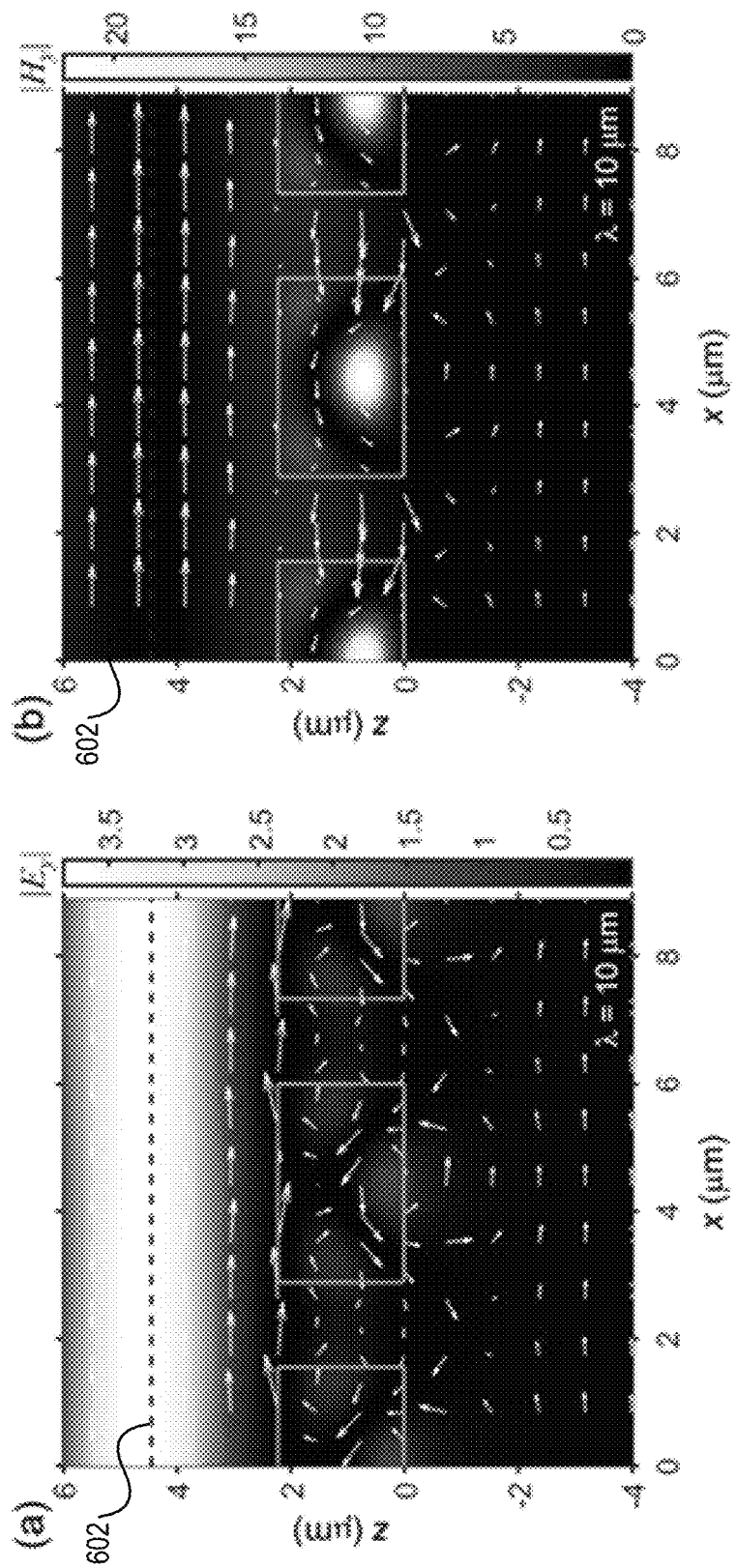
FIG. 6 shows images of electromagnetic field density plots for materials according to aspects of the present disclosure.

To better understand why near-perfect reflectance occurs in HCG of optimally selected period, filling ratio, and height, electromagnetic field density plots produced by RCWA are shown in FIG. 6 to visualize and verify planes of constructive and destructive interference. In the non-limiting examples shown in FIG. 6 materials having an HCG configuration where $\Lambda=4.4$ μm, f=0.7, and h=2.2 μm were selected. The period was chosen in relation to the Wien displacement center wavelength $\lambda_0 = 10$ μm, where then $\lambda_0/\Lambda=2.25$. FIG. 5(a) shows the electric field density under TE-polarized 10 μm wave, as well as the in-xz plane magnetic field vectors in white arrows. The three faint field localizations within the Ge HCG structures show that TE waves interact in two Fabry-Pérot round trips. The dashed line 602 at exactly z=2 h above the bottom of the grating array shows the HCG-characteristic near-perfect constructive interference of electric fields. Below the grating array, the electric field density is uniformly near zero. Panel (b) of FIG. 6 confirms this plane of perfect constructive interference, as the $|E_x|$ vectors are maximized. It is noted that the dual round-trip occurs in the grating vacuum cavity half-plane, since E is reversed and it can be seen that the magnetic field localization occurs inside the HCG, which helps produce the electric field phase reversal. In either polarization, the electric and magnetic fields are drastically reduced in the outgoing medium—all without the use of a metal absorber. Unlike metals, where power densities can accumulate near the surface due to plasmon carrier resonance, the complementary field characteristics and phase reversal inside lossless HCG can enable fundamental near-zero thermal radiative absorptance.

Additional considerations for HCG design can include expansion into a 2D array, meaning $\Lambda_x$, $\Lambda_y$, $f_x$, and $f_y$ can be distinct. 2D HCG arrays have additional reflectance bands based on cross-polarization modes, where instead of just $TM_0$ and $TE_2$ primary waveguide modes within the dual mode band wavelengths $\lambda_2$ and $\lambda_4$, the primary waveguide modes are $EH_{00}$, $EH_{20}$, $EH_{20}$, and $EH_{40}$ within both dual mode and tri mode bands, respectively. The tri mode band represents the 90-degree tilt reflectance between the HCG and creates semi-broadband high reflectance resonance conditions approaching the diffraction region ($\lambda$–$\Lambda$). The diffraction region can be interpreted as being comprised of multi-mode bands, which produce narrow high and low reflectance conditions, as shown in FIG. 5. Overall, a 2D HCG purposed for minimizing far-field normal angle incidence and emission radiative exchange does not outperform a well-designed 1D HCG array.

A comparison of structured 2D HCG combined with Fabry-Pérot multilayers will now be discussed. The combined high reflectance mechanisms of FP multilayer materials and HCG coatings on an opaque silver substrate according to the present disclosure have been evaluated. The test material (e.g., a thermal radiation barrier or sheet) included a FP multilayer having one pair of KBr and Ge quarter-wave layers on an opaque aluminum (Al) substrate. The HCG array was made of Ge, and the reflectance reduction was also compared between 1D and 2D HCG cases. All configurations of the combined FP-HCG are suitable for use on existing thermal radiation barriers or sheets, such as flexible polymer Kapton (polyimide) or Mylar (BoPET). A double-sided option is also discussed below, where the opposing side FP-HCG design can be dimensionally scaled to reflect the blackbody emission of the successive surface. The combined design was also evaluated for its effective thermal emittance reduction performance in vacuum environment and role as multilayer blankets.

Figure 7:
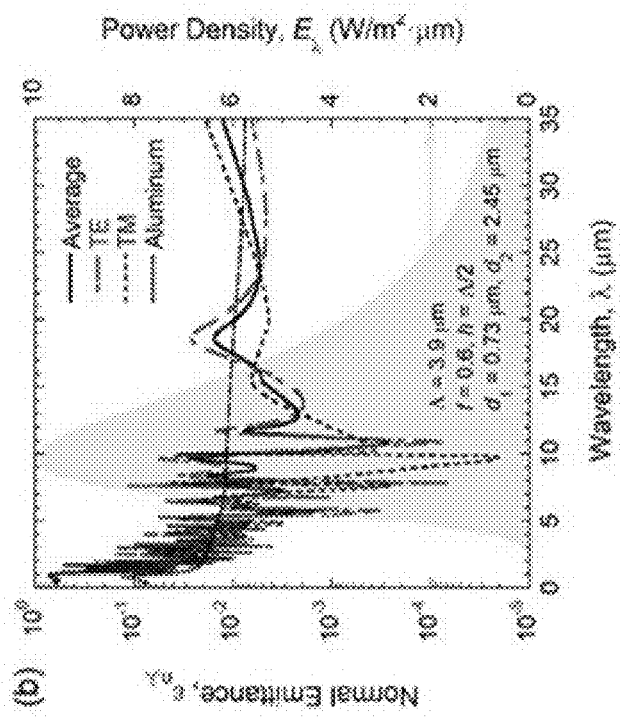
FIG. 7 shows diagrams comparing spectrums of different materials and configurations according to aspects of the present disclosure.
Figure 7:
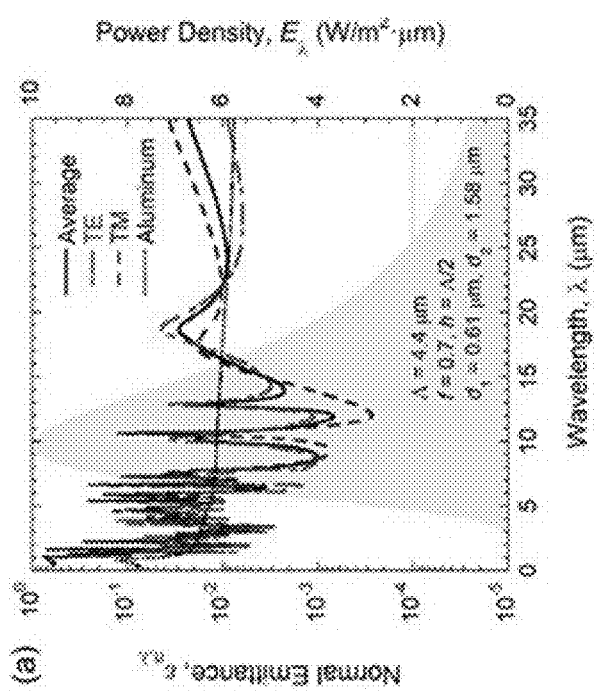

The spectral emittance of multilayers and metasurfaces were calculated using RCWA, described by Equations (3)-(6) and Equation (7) for 1D structures and 2D structures, respectively. The 1D structures can be described by grating parameters period A, filling ratio f and height h in the x dimension shown in FIG. 2A (left side), while 2D gratings can have distinct periods $\Lambda_x$ and $\Lambda_y$, and filling ratios $f_x$ and $f_y$, as shown in FIG. 2A (right side). FIG. 7 (panel (a)) shows the first iteration of the FP-HCG coating using single-pair FP parameters (e.g., from panel (a) of FIG. 4), and HCG parameters from FIG. 6. The center wavelength for FP quarter-wave thicknesses corresponds to the Wien displacement law temperature at 300 K, such that $\lambda_0$ for a 300 K blackbody is plotted in the background of emittance spectra. The normal emittance spectrum in TE and TM polarizations, and their average, of this FP-HCG combination is given by the parameters: $\Lambda$=4.4 µm, f=0.7, h=2.2 µm, $d_1$=0.61 µm, and $d_2$=1.58 µm. The result of total normal emittance with respect to 300 K blackbody is $\varepsilon_n$=0.0138, averaged over TE and TM polarizations. As a comparison, pristine Al spectrum is shown in FIG. 7 (panel (a)), which results in total normal emittance of $\varepsilon$=0.0107. While this FP-HCG configuration does not outperform the total normal emittance of pristine Al, it can outperform oxidized Al, which $\varepsilon$=0.0229, thus providing improved over time (e.g., due to reduced oxidation of the Al substrate in view of the FP and/or HCG layers providing a protective coating in accordance with the present disclosure). For the interest of providing sun-facing thermal regulation, the total normal absorptance to a 5778 K blackbody gives $\alpha_n$=0.495—not desired for continuous insolation.

Comparatively, the total normal absorptance of both pristine and oxidized Al is near $\alpha_n$=0.08. The combined FP-HCG design of the initial iteration is not able to lower its total normal emittance from that of pristine Al substrate. A parameter fluctuation survey of the FP layer thicknesses was conducted to observe new normal total emittance minima, where the layer thicknesses were expanded from d=0.61 µm to 0.92 µm, and from $d_2$=1.58 µm to 2.37 µm. In this survey, the total emittance was observed to be below $\varepsilon_n$=0.0138 for several possible configurations. The layers' thicknesses at d=0.84 µm and $d_2$=1.78 µm help slightly reduce the total normal emittance to $\varepsilon$=0.0134. Also note that the effect to total normal solar absorptance is nearly negligible with changes to $d_1$ and $d_2$. Overall, the FP layer thickness variations do not enable total normal emittance below that of pristine Al. A survey of the grating parameters was carried out as well. Changes to total normal solar absorptance remained small, but the reduction to total normal emittance was more promising for certain grating parameters, with broad minimization around grating period $\Lambda$=2.84 µm, while keeping $d_1$, $d_2$, f, and h/$\Lambda$ to their first iteration default. This grating period is much smaller than the predicted period. More importantly, this optimized period resulted in a lower total normal emittance, $\varepsilon_n$=0.0101, which is below that of pristine Al. Thus, selecting the appropriate grating period may have a higher impact on minimizing emittance than the filling ratio and the height-period ratio. Generally, a filling ratio in a selected range near f~0.6 and the height-period ratio near h/$\Lambda$~0.5 can minimize emittance provided the other four co-varying parameters are chosen wisely. This kind of simultaneous consideration of parameter combinations was used to conduct an extensive 50,000 sample co-randomized survey of all FP and HCG parameters. Results of the survey provided absolute total normal emittance with various combinations of all five parameters $d_1$, $d_2$, $\Lambda$, f, and h/$\Lambda$, respectively. Based on this survey, a distinct minimum was found, with clear relationships from $\Lambda$ and h/$\Lambda$ but less so from f, $d_2$, and $d_1$, in that order.

Using the large-sample co-randomized survey of FP and HCG parameters, it was found that $\Lambda$=3.9 µm, f=0.6, h=1.95 µm, $d_1$=0.73 µm, and $d_2$=2.45 µm results in total normal emittance $\varepsilon_n$=8.52×10$^{-3}$. Additionally, the TE- and TM-polarized total normal emittances were $\varepsilon_{TE}$=0.0106 and $\varepsilon_{TM}$=6.40×10$^{-3}$. The survey demonstrated that ±10 nm fluctuations on each parameter results in generally less than 10% total normal emittance increase, with the low-index layer thickness ($d_2$) being the most sensitive. Panel (b) of FIG. 7 shows the normal emittance spectra of this globally optimized configuration, where the very low TM-polarized normal emittance is evident by the minimum $\varepsilon_{n,\lambda}$=2.04×10$^{-5}$ at $\lambda$=9.75 µm, close to the Wien displacement maximum wavelength. While TE-polarized normal emittance is high ($\varepsilon_{n,\lambda}$=0.0428) at this wavelength, some neighboring wavelengths ($\lambda$=7.88 µm and $\lambda$=10.9 µm) also show emittance minima on the order of $\varepsilon_{n,\lambda}$=7×10$^{-5}$. Compared to the initial configuration, this optimized configuration achieves lower total normal emittance due to sharp minima alternating between TE and TM polarizations. Whereas the initial configuration maintains less sharp emittance valleys or interference fringes between TE and TM polarizations in phase. In full comparison, the total solar absorptance remains essentially unchanged at $\alpha_n$=0.492. A dielectric coatings' thermal emission reduced below that of the opaque metal substrate is possible, and with a more conductive metal substrate, such as Ag, could result in even lower thermal emission.

For 2D gratings calculated by RCWA, the calculations were first verified using the FP-HCG configuration shown in panel (b) of FIG. 7. The order number of the 2D RCWA calculations remained at N=19 for each coordinate, giving total 361 calculation orders, resulting in computation time of each case over ~1000 seconds on 12 parallel Intel Xeon E5-2680 2.4 GHz CPUs. There are some slight differences in spectral emittance minimum. For instance, TM-polarized normal emittance is minimum at $\lambda$=9.0 µm, where $\varepsilon_{n,\lambda}$=4.39×10$^{-5}$. The total normal emittance of the optimized configuration using our 2D RCWA resulted in $\varepsilon_n$=8.01×10$^{-3}$, which is not drastically different. In finding a suitable 2D grating configuration, the FP layer thicknesses, grating height, and grating filling ratios in both dimensions may be fixed. For rectangular high reflectance 2D HCGs on a substrate, the filling ratios may be the same, $f_x$=$f_y$=0.6, while the y-direction period may be scaled by half of that of x, such that $\Lambda y$=0.5 $\Lambda x$.

Figure 8:
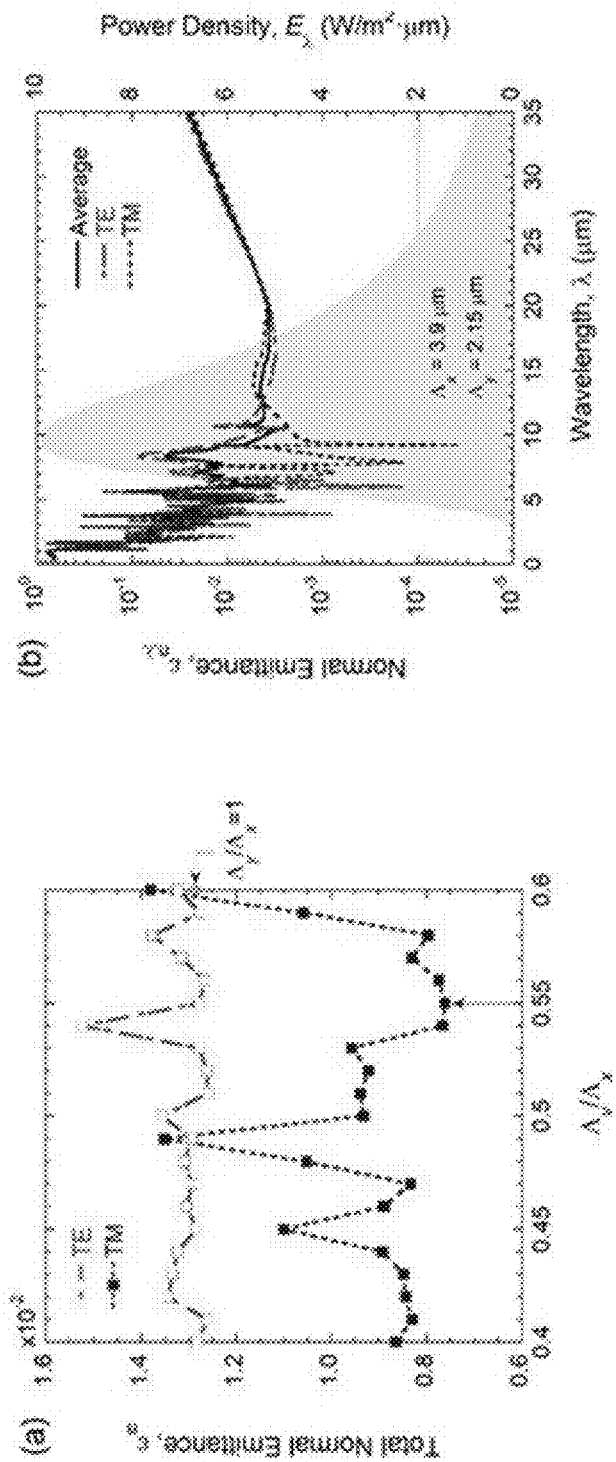
FIG. 8 shows diagrams illustrating exemplary emittance properties of materials in accordance with aspects of the present disclosure.

Referring to FIG. 8, panel (a) confirms this suggested x-y period ratio, where the total normal emittance is minimized at $\Lambda_y$=0.55 $\Lambda_x$. All other grating and multilayer parameters were the same as shown in panel (b) of FIG. 8, strictly that $\Lambda_x$=3.9 µm. The minimum emittance is led by the TM polarization, where $\varepsilon_{TM}$=7.61×10$^{-3}$. With the TE polarization ($\varepsilon_{TE}$=0.0128), the average total normal emittance becomes $\varepsilon_n$=0.0102. Panel (b) of FIG. 8 shows the normal emittance spectrum for this configuration, where TE- and TM-polarized emittance minima were relatively narrowband compared to the best 1D grating case. One advantage of the 2D grating is its tempered TE-polarized reflectance fringes in wavelengths beyond the center wavelength, $\lambda_0$>10 µm. While this 2D grating configuration outperforms pristine Al, it does not always outperform the 1D grating described by panel (b) of FIG. 7. For square gratings, such that $\Lambda_y$=$\Lambda_x$, the total normal emittance becomes $\varepsilon_n$=0.0128. For some design configurations involving ultrahigh normal reflectance HCG, long-groove gratings offer the best performance, especially if room temperature thermal emission and absorption can be just TM-wave polarized. In the consideration of diffuse emission of external surfaces and interlayer thermal exchange, the next section discusses the hemispherical properties and an optimization of a backside-coated thermal insulation flexible blanket.

The focus of the previous section assumes that thermal radiative exchange is relevant to only the normal incidence. This assumption holds for multilayer insulation sheets separated by sub-millimeter distances, as radiative transfer is between semi-infinite parallel surfaces. For the interest of off-normal thermal emission, the spectral emittance of the optimized FP-HCG configuration associated with panel (b) of FIG. 7 may be hemispherically integrated. To illustrate, panel (a) of FIG. 8 shows the hemispherical emittance spectra, where integrated total hemispherical emittance of the coating on an Al substrate is $\varepsilon_H=0.0144$. The total hemispherical absorptance is $\alpha_x=0.551$, which is higher than its normal emittance. The comparison to pristine Al gives total hemispherical emittance of $\varepsilon_H=0.0133$. The relatively low total hemispherical emittance of the FP-HCG-coated Al is due to the broadband emittance minimization near $\lambda=12.25$ μm, where $\varepsilon_{H,\lambda}=8.47\times10^{-4}$. This configuration's wavelength and angular incidence dependence of TE- and TM-wave emittance can explains the low overall emittance in the 10 to 15 μm wavelength region due to TM-wave HCG resonance dispersion. The overall low hemispherical emittance of the coating suggests good performance for low thermal exchange external surfaces or obliquely oriented objects.

In the evaluation of radiative exchange between semi-infinite parallel coated blankets, we assess the effective emittance or "e-star" ($\varepsilon^*$) at normal incidence, described by:

$$\varepsilon^* = \frac{1}{\sum_{n=1}^{N-1}\left(\frac{1}{\varepsilon_{f,n}}+\frac{1}{\varepsilon_{b,n+1}}\right)-1} \quad \text{Equation (10)}$$

where subscripts "f" and "b" denote the front and back sides each double-sided multilayer insulation sheet, with N number of total layers. With small temperature differences between insulation sheets ($T_n \ast T_{n+1}$), the total effective emittance can be provided by the spectral normal emittance integration given in Equation (8) above. However, with larger temperature differences between each insulation layer, the total effective emittance must be calculated with the Planck blackbody temperature-wavelength distribution of each coating face, such that:

$$\varepsilon_{f,n}=\int_0^\infty \varepsilon_{f,n}^\lambda \Theta(\lambda,T_n)d\lambda/\sigma T_n^4 \text{ and } \varepsilon_{b,n+1}=\int_0^\infty \varepsilon_{b,n+1}^\lambda \Theta(\lambda,T_{n+1})d\lambda/\sigma T_{n+1}^4 \quad \text{Equation (11)}$$

A parameter survey similar to the one discussed above yielded a backside coating configuration that resulted in a minimum total effective emittance between a front and back side of $\varepsilon^*=3.17\times10^{-3}$. The front side coating was the same as the one presented in panel (b) of FIG. 7. The backside Ge HCG and Ge-KBr FP parameters can be described by $\Lambda=2.98$ μm, f=0.64, h=1.16 μm (h/$\Lambda$=0.39), $d_1=0.586$ μm, and $d_2=2.087$ μm. This back side configuration alone provides total normal emittance of $\varepsilon_n=0.0101$, TE-polarized emittance $\varepsilon_{TE}=0.0116$, and TM-polarized emittance $\varepsilon_{TM}=8.70\times10^{-3}$. Despite a higher total normal emittance than that of the optimized front side, this back side is designed around spectral minimizations, as shown in FIG. 9C. For instance, where the front size spectral emittance reaches a local maximum at $\lambda=18.5$ μm, the same wavelength yields a broad local minimum for the back side, where $\varepsilon_{n,\lambda}=0.0032$. The same can be said for the inverse, where the front side is low while the back side is high emittance at $\lambda=13$ μm. This complementary design of the back side helps optimize toward minimum total effective emittance through canceling of the front side's high emittance interference fringes.

Figures 9B, 9C:
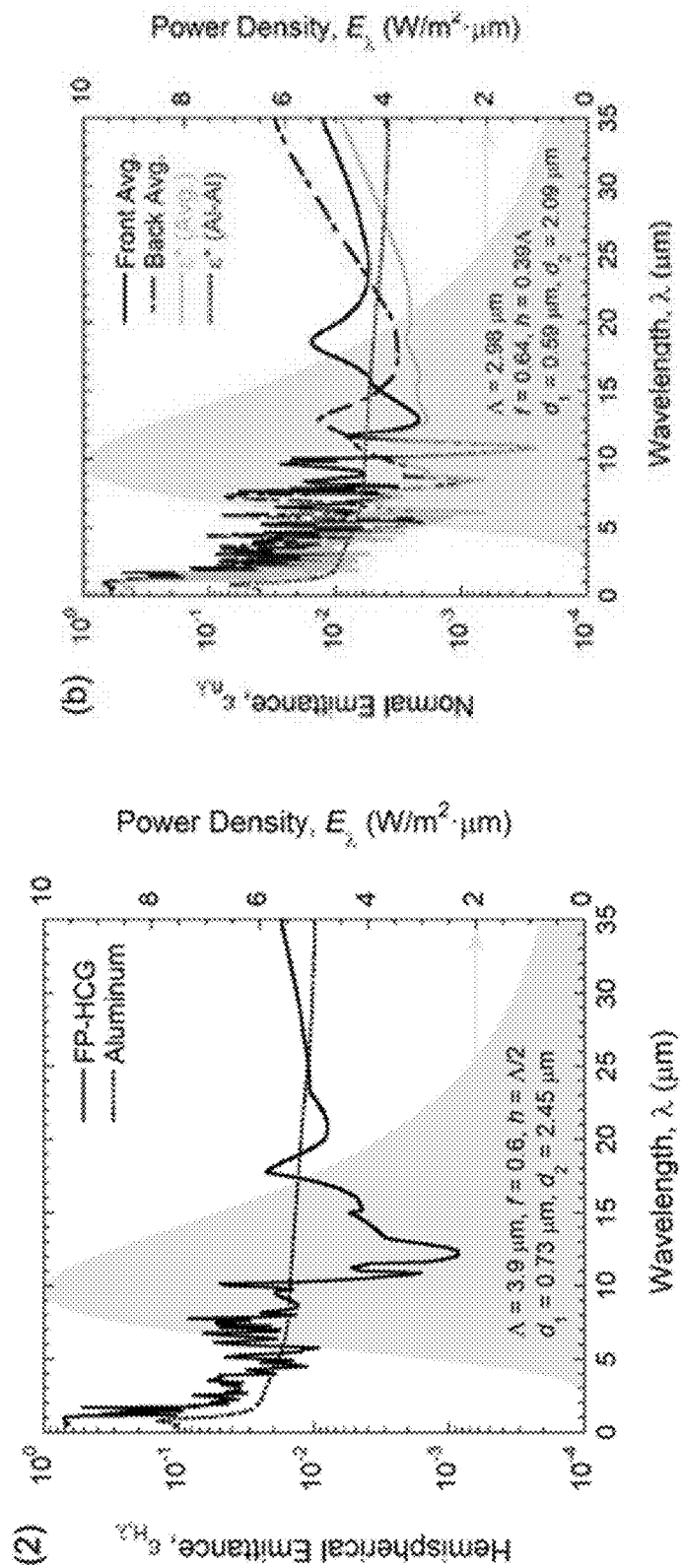
Figure 10:
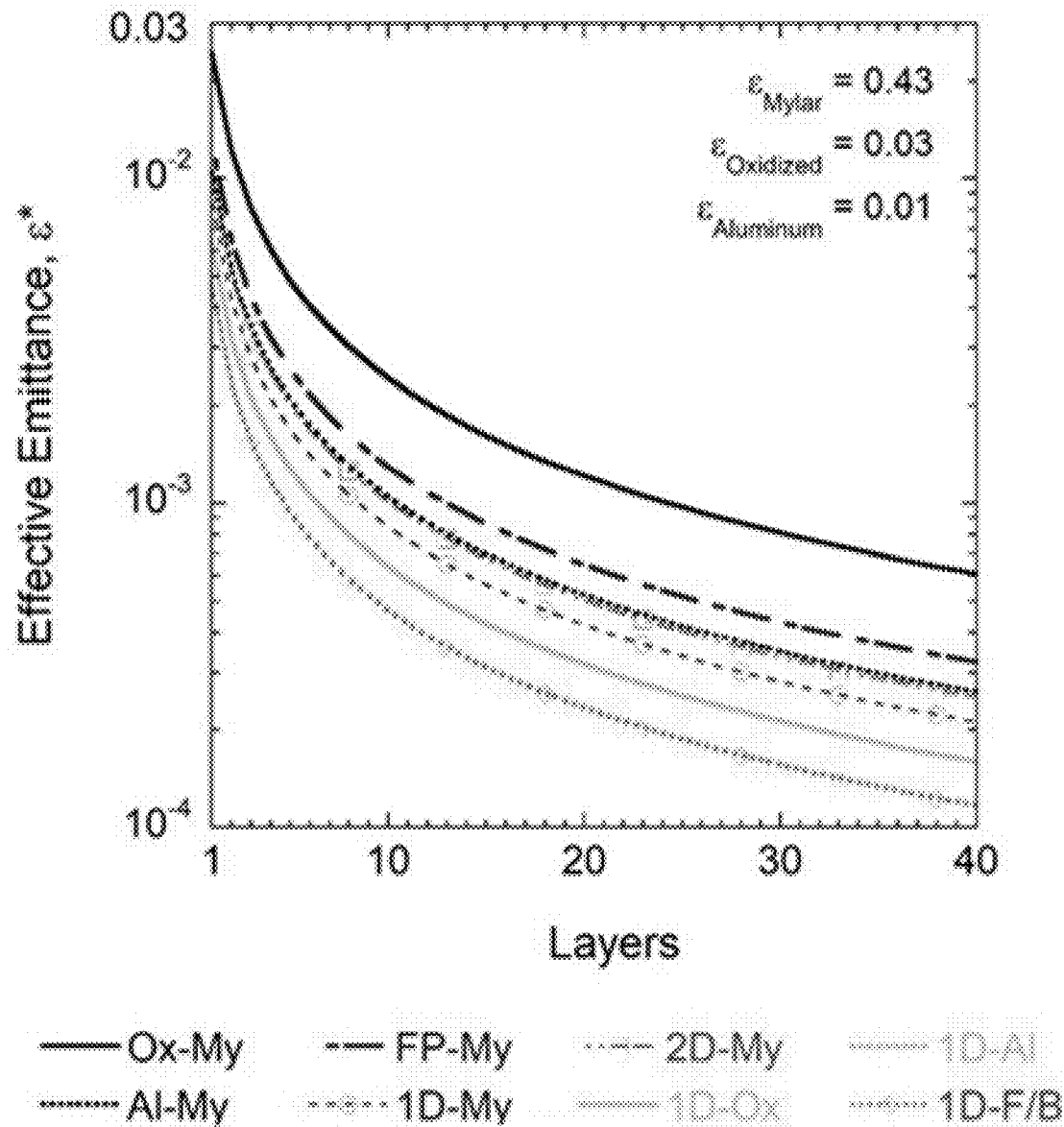
FIG. 10 shows a diagram comparing total emittance of materials according to the present disclosure to other materials.

Compared to two pristine smooth aluminum faces, $\varepsilon^*=5.32\times10^{-3}$, the front and back side optimized FP-HCG coatings can achieve a 1.67 factor e-star reduction per insulation sheet. If calculation of effective emittance can distinguish linearly polarized TE- and TM-waves, the polarization-dependent e-stars are $\varepsilon^*_{TM}=2.78\times10^{-3}$ and $\varepsilon^*_{TE}=2.80\times10^{-3}$. Realistically, thermal radiative emission and exchange occurs without polarization preference. It is noted that with greater temperature differences between insulation layers, the FP-HCG design for each side can be scaled to minimize spectral normal emittance with Planck blackbody function weighting. Furthermore, this optimization of parameters can be conducted on cryogenic temperature blackbody emission up to temperatures where either the polymer substrate or metal thin film melts −250° C. (operation limit 150° C.) for Mylar and 650° C. (operation limit 250° C.) for aluminum. To illustrate the overall thermal insulation effect of the FP-HCG coating on effective emittance $\varepsilon^*$, FIG. 10 plots several configurations with respect to the number of insulation layers (N). The various configurations correspond to: Single-sided Mylar substrate with oxidized Al (Ox-My), with pristine Al (Al-My), with a single pair Ge-KBr Fabry-Pérot (e.g., FIG. 4, panel (a)) (FP-My), with the optimized FP-HCG (e.g., FIG. 7, panel (b)) (1D-My), and with the optimized 2D HCG in (e.g., FIG. 8, panel (b)) (2D-My). With double-sided options, oxidized Al faces the optimized FP-HCG (1D-Ox), pristine Al faces the optimized FP-HCG (1D-Al), and front and back sided FP-HCG presented in (e.g., FIG. 9C) (1D-FB). For reference, the total emittance of Mylar, oxidized Al, and pristine Al are given in FIG. 10. The first configuration (Ox-My) is considered a theoretical minimum curve. While FP coated Aluminized Mylar outperforms this curve by an effective emittance reduction factor of 1.88, it does not outperform pristine Aluminized Mylar (Beginning of Life).

This factor is improved to 2.87 with the 1D HCG on FP coating, while per the discussion above regarding the 2D HCG, this factor is slightly lower at 2.41. The bigger improvement is with double-sided insulation. The improvement factor is 3.80 for the FP-1D HCG coating with a standard oxidized Al back side; this factor is 1.97 compared to double-sided oxidized Al. The emittance curve is minimized with the double-coated sheets, prescribed by the mismatched FP-HCG in (e.g., FIG. 9C). This gives a factor of 5.22 over single-sided oxidized aluminized Mylar, and 2.71 over double-sided oxidized aluminized Mylar. The effective emittance reduction factor of a pristine Al back side is about the same, but its performance is likely short-lived. With 40 layers, which in total compose a thick insulation blanket with idealized zero conductance separation construction materials, the effective emittance can reach $\varepsilon^*=1.16\times10^{-4}$. Overall, these effective emittance reduction factors represent the heat flux reduction scaling of multilayer insulations constructed with these augmented coatings.

Figure 9A:
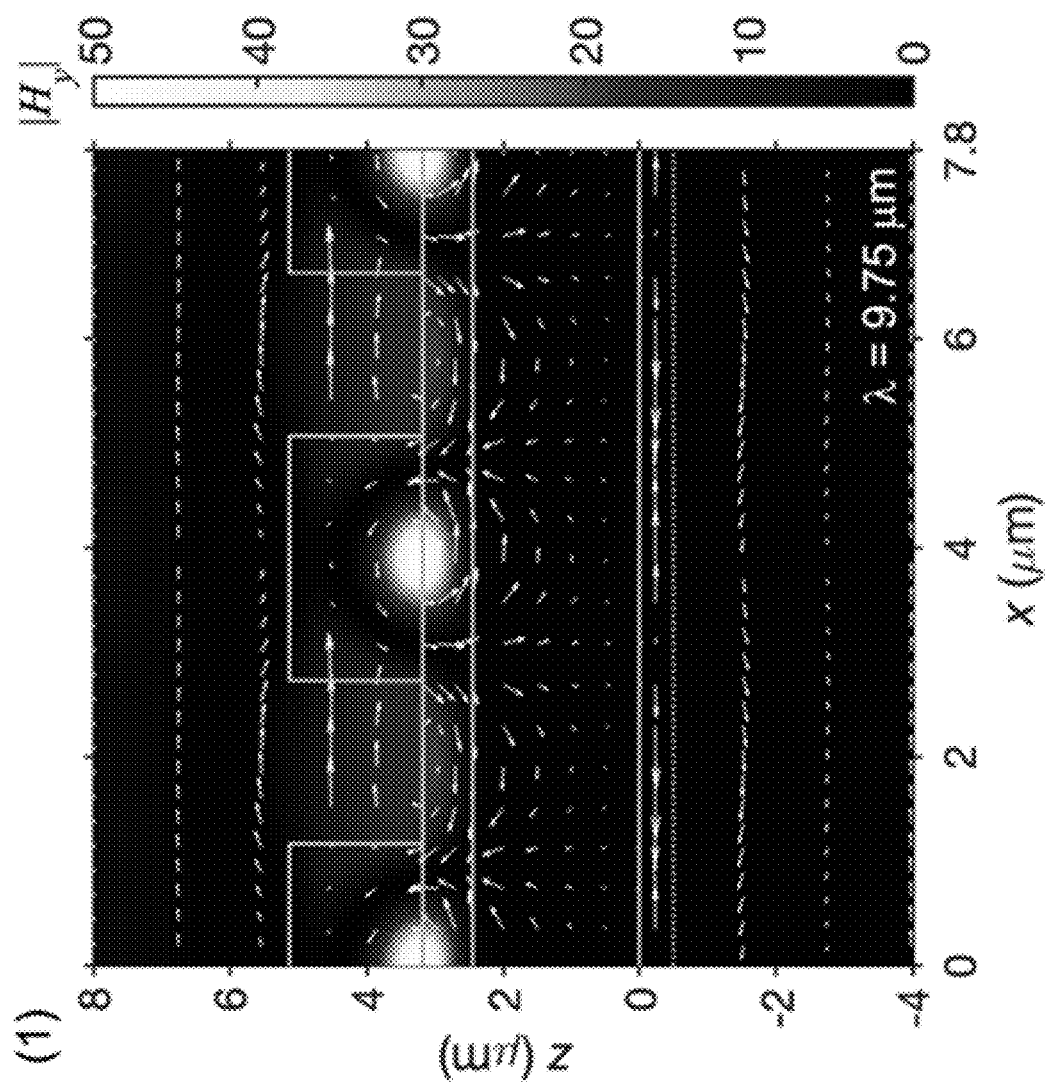
FIGS. 9A-9C show diagrams illustrating characteristics of materials generated in accordance with aspects of the present disclosure.

Referring to FIG. 9A, a diagram illustrating mechanisms for minimal emittance in the coating is shown. In particular, the diagram in FIG. 9A shows the electric and magnetic fields in the vertical (z) and lateral horizontal (x) directions given in μm. The arrows correspond to electric fields, and the grayscale on right corresponds to magnetic fields. In this diagram, the wave type is transverse magnetic. The mechanism may be polarization dependent. The wavelength illustrated is 9.75 μm, corresponding to far-infrared. Key markings in FIG. 9A are the small electric fields at the interface between the metal layer and low-index layer. This interface corresponds to layers 256 and 258 in FIG. 2B. Secondary key markings are the large magnetic fields localized in the center of the raised features, corresponding to the solid in layer 252 in FIG. 2B.

Referring to FIG. 9B, a diagram demonstrating the all-direction emittance minimization of the coating configuration depicted in FIG. 9A is shown. The dimensions are listed in the diagram. Hemispherical emittance is the combined total electromagnetic radiation in all directions, from −90° C. to +90° C. The diagram is a spectrum over electromagnetic wavelength, where the blackbody radiation region is highlighted by the smooth filled background curve given in power density units. The coating is designated by 'FP-HCG'. The spectrum of pure and polished aluminum is represented by the dotted curve. The emittance minimization mechanism relies on the broad lower values in the range between 10 µm and 20 µm.

In the final discussion of this FP-HCG coating, the suitability of the coating materials across different environments, with thermal, mechanical, and fluid conditions is considered. The exemplary materials described in many of the examples above, specifically, Ge and KBr, have high melting temperatures, 938° C. and 734° C., respectively, beyond the limit for both the polymer substrate and metal thin film. The linear coefficient of thermal expansion of Ge is approximately 6 µm/m·° C., while KBr has a CTE of near 40 µm/m·° C.

With temperature increase, the lack of expansion in the Ge layer means the HCG retains its shape, while the high CTE of the underlying layers including the Al and Mylar (30 µm/m·° C. and 170 µm/m·° C., respectively) allows the sheet to bow upward at the edges. Heating of double-sided sheets may put the Ge top layers in tension. Ge, however, has a high tensile modulus of 130 GPa, which given a ~1 µm thickness Ge per side, can exert as much compressive force as a 65 µm (2.5 mil) thick Mylar substrate in thermal expansion. While Ge is resistant to water solubility (5 g/L), infrared-transparent salt KBr is water soluble (700 g/L). This may present issues with delamination, but with large-area Ge gratings, similar characteristic micro-patterned surfaces have been found to reduce wettability or increase contact angles with water droplets. In addressing the manufacture and construction of these coated flexible insulation sheets, large-area physical vapor sputter deposition chambers and subsequent mask-aligned photolithography can produce variable multi-layered gratings on pre-made polished metallized polymer sheets. As explained above with reference to FIG. 1, the system 100 may implement a process flow for a scalable manufacturing method leveraging such techniques to realize thermal radiation barriers consistent with those described herein.

Figure 12:
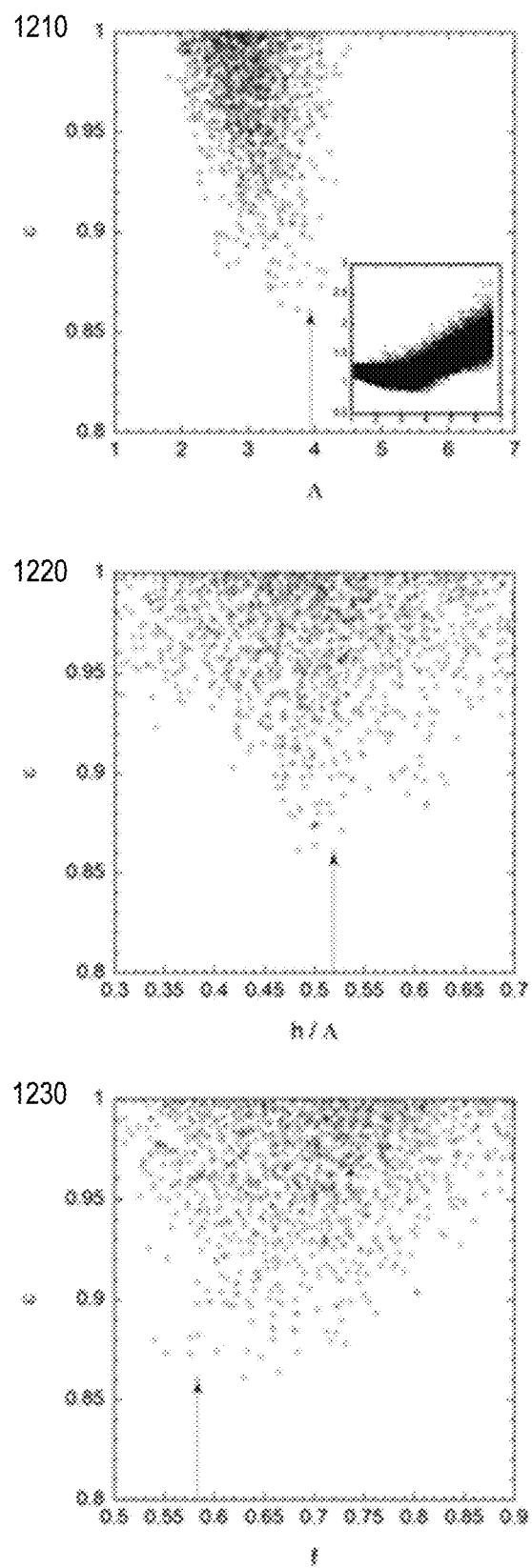
FIG. 12 shows exemplary aspects of determining dimensions of layers.

Referring to FIG. 12, exemplary aspects of determining dimensions of layers are shown. In particular, FIG. 12 illustrates aspects related to determining the dimensions of the various layers described above with reference to FIG. 2B, which may be determined using computational sampling of total emittance ($\varepsilon$) data. The lateral pattern period ($\Lambda$) in layer 252 of FIG. 2B may be determined by the minimization of $\varepsilon$, the corresponding dimension is at the vertical upward arrow. In this instance, the duty cycle is 3.9 µm. The number of samples covers at least 104, where the inset shows a large data set. The thickness relative to the duty cycle (h/$\Lambda$) in layer 252 of FIG. 2B is also determined by the minimization of $\varepsilon$ the corresponding dimension is at the vertical upward arrow. In FIG. 12, diagram 1210 shows a plot of $\varepsilon$ along the vertical axis and $\Lambda$ along the horizontal axis, diagram 1220 shows a plot of $\varepsilon$ along the vertical axis and h/$\Lambda$ along the horizontal axis, and 1230 shows a plot of $\varepsilon$ along the vertical axis and a selected duty cycle (f) along the horizontal axis. The concurrent selection of relative thickness and duty cycle obtains h/$\Lambda$=0.52 and f=0.58.

The total emittance data produced in FIG. 12 is also used to select thicknesses of layers 254 and 256 in FIG. 2B. The minimum emittance corresponds to the thicknesses of the low-index and high-index solid layers.

The methodology in FIG. 11 disputes the efficacy of Fabry-Pérot mechanism made by the $\lambda/4n$ quarter-wave thickness rule, where n is the refractive index. The thicknesses of layers 254 and 256 in FIG. 2B are slightly greater or smaller than the Fabry-Pérot quarter-wave thickness. The slight deviation can vary up to 60%, where thickness is no greater than $0.4\lambda/n$ and no less than $0.1\lambda/n$. It is noted that the methodology success may be reliant on large data set computational sampling.

Figure 13:
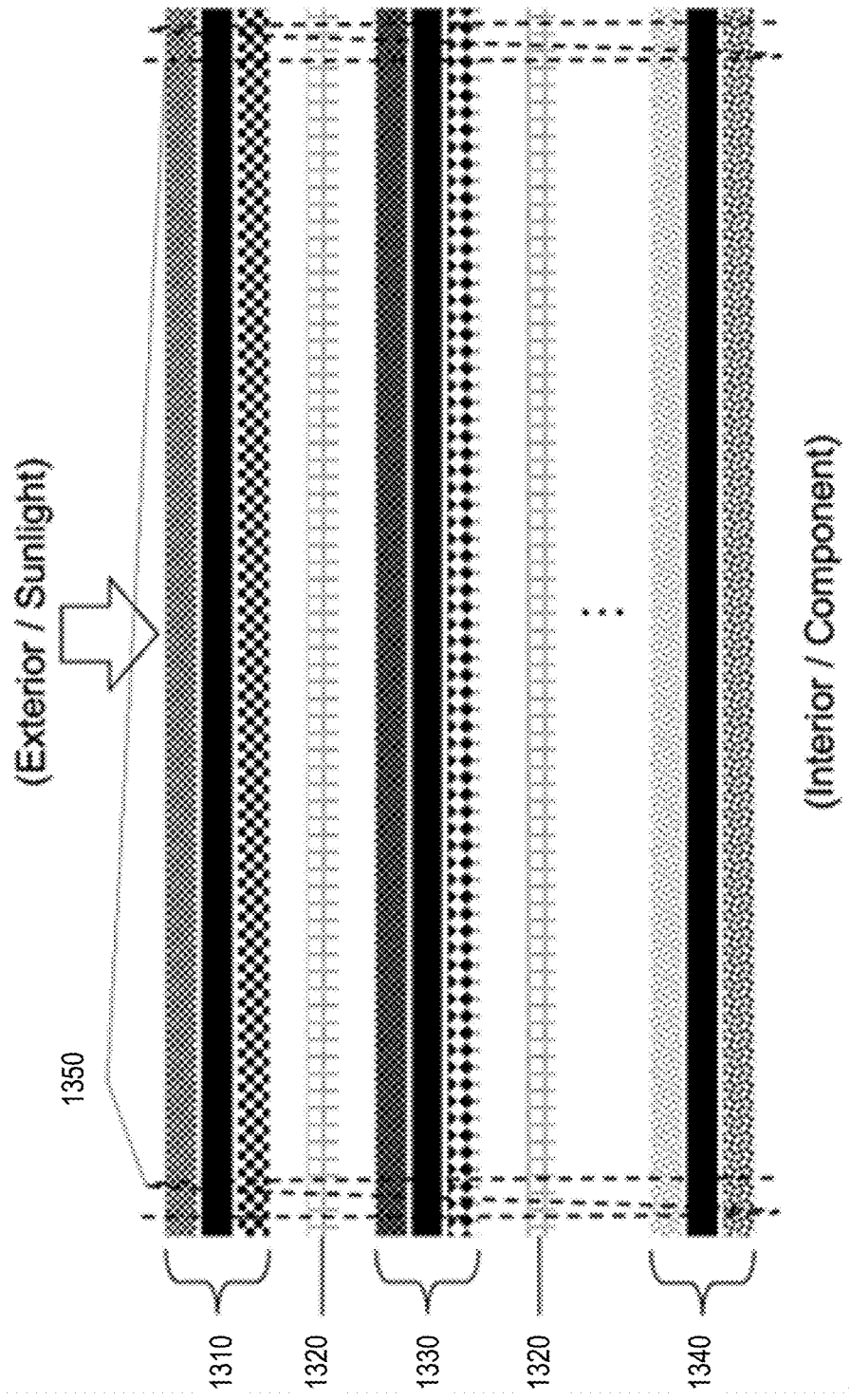
FIG. 13 shows a diagram illustrating radiative transfer in a multilayer insulation device.

Referring to FIG. 13, a diagram illustrating radiative transfer in a multilayer insulation device is shown. In particular, FIG. 13 illustrates radiative transfer between semi-infinite parallel surfaces (e.g., a multi-layer thermal radiation barrier in accordance with the present disclosure). For the interest of off-normal thermal emission, the spectral emittance of the optimized FP-HCG configuration shown in FIG. 9B is hemispherically integrated. FIG. 13 shows the overall or effective low emittance of multiple coatings for low thermal exchange external surfaces or obliquely oriented objects. In the evaluation of radiative exchange between semi-infinite parallel coated blankets, the effective emittance or "e-star" ($\varepsilon^*$) at normal incidence is assessed. The low e-star is achieved by mismatched coatings, distinguishing feature 1310 from feature 1330, and feature 1330 from feature 1340. The mismatching dimensions and materials in FIG. 2B allows front and back side spectral minimizations. For instance, where the front size spectral emittance reaches a local maximum at $\lambda=18.5$ µm, the same wavelength yields a broad local minimum for the back side. The same can be said for the inverse, where the front side is low while the back side is high emittance at $\lambda=13$ µm. This complementary design of the back side helps optimize toward minimum total effective emittance through canceling of the front side's high emittance interference fringes. This complementary design of the back side helps optimize toward minimum total effective emittance through canceling of the front side's high emittance interference fringes. Support structures, such as mesh spacer layers 1320 and low-conductance threads 1350, may be utilized to maintain integrity of the multilayer insulation.

A double-sided coating in this configuration can reduce thermal insulation by A high number of layers, represented by the ' . . . ' in FIG. 13 composed of mismatched coatings of many types between features 1330 and 1340 can obtain idealized zero energy transfer in the vertical direction of the device. Overall, these effective emittance reduction factors represent the heat flux reduction scaling of multilayer insulations constructed with these augmented coatings.

The coating is suitable and survivable across different environments, with thermal, mechanical, and fluid conditions. The exemplary materials described in many of the examples above, specifically, Ge and KBr, have high melting temperatures, 938° C. and 734° C., respectively, beyond the limit for both the polymer substrate and metal thin film. The linear coefficient of thermal expansion of Ge is approximately 6 µm/m·° C., while KBr has a CTE of near 40 µm/m·° C.

With temperature increase, the lack of expansion in the Ge layer means the HCG retains its shape, while the high CTE of the underlying layers including the Al and Mylar (30

µm/m·°C. and 170 µm/m·°C., respectively) allows the sheet to bow upward at the edges. Heating of double-sided sheets may put the Ge top layers in tension. Ge, however, has high tensile modulus of 130 GPa, which given a ~1 µm thickness Ge per side, can exert as much compressive force as a 65 µm (2.5 mil) thick Mylar substrate in thermal expansion.

The coating is resistant to dissolution in moisture and water droplet exposure. While Ge is resistant to water solubility (5 g/L), infrared-transparent salt KBr is water soluble (700 g/L). This may present issues with delamination, but with large-area Ge gratings, similar characteristic micro-patterned surfaces have been found to reduce wettability or increase contact angles with water droplets. In addressing the manufacture and construction of these coated flexible insulation sheets, large-area physical vapor sputter deposition chambers and subsequent mask-aligned photolithography can produce variable multilayered gratings on pre-made polished metallized polymer sheets. As explained above with reference to FIG. 11, the system may implement a process flow for a scalable manufacturing method leveraging such techniques to realize thermal radiation barriers consistent with those described herein.

As shown above, embodiments of the present disclosure provide a dual-material layered coating that can achieve normal emittance lower than its pristine metal thin film substrate. Not only does the inert and dielectric coating protect the metal against further degradation or oxidation, the proven infrared-transparent Ge surface can also provide ESD, impact, and possibly moisture protection of underlying materials, thereby improving the performance and longevity of the barrier or sheet. The broadband ultrahigh reflectance from the surface Ge layer is enabled with a high-contrast grating micropattern. The principles of high reflectance show the HCG period is near-wavelength corresponding to blackbody emission, on order of 2.5 to 3 times smaller than the center wavelength. The HCG width-to-period filling ratio or duty cycle can be near 0.6, and case HCG height-to-period ratio can be near 0.5. A filling ratio too high reduces the reflectance intensity, despite increasing number of waveguide modes. A short HCG produces single round-trip Fabry-Pérot resonant modes, allowing near-perfect electromagnetic field cancellation above the plane of the HCG array. The high-index dielectric HCG can be combined with a Fabry-Pérot multilayer consisting of Ge and an infrared-transparent low-index cavity layer KBr. The FP layers are not quite described by the quarter-wave thickness law, despite little variation to total emittance with respect to 10% thickness change. Through random surveying of combined HCG and FP parameters, it has been shown that wave conditions exiting the HCG and interfering in the near-FP cavity are not the same as those incident.

With some adjustment to the FP thicknesses, while keeping grating period, filling ratio, and height nearly analytic, a total normal emittance can be lowered, below that of its pristine substrate, such as to 0.0085 which is below the total normal emittance of an Al substrate. Another round of parameter optimization found a back side FP-HCG coating configuration that results in effective normal emittance of 0.0032. Design for broadband ultrahigh reflectance HCG involving 1D grooves (e.g., left side of FIG. 2A) can provide enhanced performance, whereas 2D surface grating micropatterning (e.g., right side of FIG. 2A) results in slightly lowered performance (e.g., as compared to the 1D grooves). However, the coating parameters are insensitive to dimensional uncertainty.

Despite being a good thermal radiative resistor for the terrestrial room temperature blackbody, the coating materials present high solar absorptance. Overall, coating applied in accordance with the present disclosure can be physically protective and thermal radiative insulation performance enhancing, especially as double-sided sheets in a multilayer insulation blanket. The factor of thermal radiative transfer reduction is almost a magnitude-fold. With further theoretical investigation and micromanufacturing realization of this coating, more advantageous capabilities could be uncovered. It is to be understood that enhancing performance of radiative insulation for components in the vacuum of space, the materials (e.g., barriers, sheets, blankets, etc.) formed using the coating techniques described herein can also be applied to structural insulation, clothing liners, fire protection applications, possibly hydrophobic and anti-dust treatments, as non-limiting examples of additional use cases for embodiments of the present disclosure.

TABLE 2

Summary of Terminology

| | |
|---|---|
| $T =$ | temperature, °C. or K |
| $\tau =$ | transmittance |
| $\theta =$ | incident angle, rad |
| $\Theta =$ | Planck blackbody function, W/µm · m$^2$ |
| $S =$ | surface roughness scattering coefficient |
| $\sigma =$ | Stefan-Boltzmann constant, W/m$^2$ · K$^4$ |
| $v =$ | eigenvector |
| $w =$ | grating width, µm |
| Subscripts and Superscripts | |
| $b =$ | back |
| $f =$ | front |
| $Gr =$ | grating |
| $h =$ | high refractive index material |
| $H =$ | hemispherical |
| $inc =$ | incident |
| $l =$ | low refractive index material |
| $m =$ | metal layer |
| $n =$ | normal incident |
| $p =$ | plasma |
| $r =$ | roughness |
| $rms =$ | root-mean-square |
| $sub =$ | substrate |
| $TE =$ | transverse electric |
| $TM =$ | transverse magnetic |
| $* =$ | Effective |
| $\alpha =$ | absorptance |
| $\beta =$ | lateral wavevector, rad/m |
| $c_0 =$ | speed of light, m/s |
| $d =$ | layer thickness, µm |
| $\delta =$ | root-mean-square roughness, nm |
| $E =$ | electric field |
| $\varepsilon =$ | emittance |
| $f =$ | grating width-to-period filling ratio or duty cycle |
| $h =$ | grating height, µm |
| $H =$ | magnetic field |
| $\hbar =$ | Planck constant, J · s |
| $k =$ | wavevector, rad/m |
| $k_B =$ | Boltzmann constant, J/K |
| $\kappa =$ | absorption coefficient |
| $\lambda =$ | wavelength, µm |
| $\Lambda =$ | grating period, µm |
| $n =$ | refractive index |
| $N =$ | orders, or layers |
| $\omega =$ | frequency, rad/s |
| $\psi =$ | phase, rad/s |
| $q =$ | eigenvalue |
| $r =$ | Fresnel reflection coefficient |
| $\rho =$ | reflectance |
| $t =$ | Fresnel transmission coefficient |

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

The invention claimed is:

1. A method comprising:
   providing a substrate; and
   disposing a Fabry-Pérot (FP) layer on the substrate, wherein the FP layer is configured to alter emittance or reflective properties of the substrate; and
   further comprising disposing a high-contrast grating (HCG) on the FP layer.

2. The method of claim 1, wherein the HCG includes a plurality of grating features separated from each other along at least a first axis.

3. The method of claim 2, wherein the plurality of grating features are ridges.

4. The method of claim 2, wherein each the plurality of grating features are separated from each other along a second axis.

5. The method of claim 2, wherein the plurality of grating features are pillars.

6. The method of claim 1, further comprising disposing a second FP layer on a surface of the substrate opposite the FP layer.

7. A thermal radiation barrier comprising:
   a substrate; and
   a Fabry-Pérot (FP) layer disposed on a surface of the substrate, wherein the FP layer is configured to alter emittance or reflective properties of the substrate; and
   a high-contrast grating (HCG) disposed on the FP layer.

8. The thermal radiation barrier of claim 7, wherein the HCG includes a plurality of grating features separated from each other along at least a first axis.

9. The thermal radiation barrier of claim 8, wherein the plurality of grating features are ridges.

10. The thermal radiation barrier of claim 8, wherein each of the plurality of grating features are separated from each other along a second axis.

11. The thermal radiation barrier of claim 8, wherein the plurality of grating features are pillars.

12. The thermal radiation barrier of claim 8, wherein the plurality of grating features include pillars and ridges.

13. The thermal radiation barrier of claim 7, further comprising a second FP layer disposed on a second surface of the substrate, the second surface being different from the surface.

14. The thermal radiation barrier of claim 7, wherein the substrate is flexible.

15. The thermal radiation barrier of claim 7, further comprising one or more mesh layers.

16. The thermal radiation barrier of claim 7, further comprising threads running through the substrate and the FP layer.

* * * * *

UNITED STATES PATENT AND TRADEMARK OFFICE
CERTIFICATE OF CORRECTION

PATENT NO. : 12,392,932 B2
APPLICATION NO. : 18/222439
DATED : August 19, 2025
INVENTOR(S) : Zihao Richard Zhang It is certified that error appears in the above-identified patent and that said Letters Patent is hereby corrected as shown below:

In the Specification

Column 8, Line 29, delete "period A" and replace with --period $\Lambda$--.

Column 11, Line 47, Equation (4), delete the portion of the equation reading "$\Sigma_o\, n_{j-p}^2(x) E_p$" and replace with --$\Sigma_p\, n_{j-p}^2(x) E_p$--.

Column 12, Line 22, delete "for they direction" and replace with --for the y direction--.

Column 12, Line 30, Equation (7b), delete the portion of the equation reading
"$H_{Gr} = i\sqrt{\frac{\varepsilon_0}{\mu_0}} \Sigma_{j,l}(z)\hat{\imath} + H_{y,jl}(z)\hat{\jmath} + H_{z,jl}(z)\hat{k}]$" and replace with
--$H_{Gr} = i\sqrt{\frac{\varepsilon_0}{\mu_0}} \Sigma_{j,l}[H_{x,jl}(z)\hat{\imath} + H_{y,jl}(z)\hat{\jmath} + H_{z,jl}(z)\hat{k}]$--.

Column 12, Line 37, delete "±A" and replace with --±M--.

Column 13, Line 15, delete "0.57π, 1.57π, 2.57π" and replace with --0.5π, 1.5π, 2.5π--.

Column 16, Line 33, delete "(λ - Λ)" and replace with --(λ ~ Λ)--.

Column 16, Line 64, delete "period A" and replace with --period $\Lambda$--.

Column 19, Line 9, delete "$\alpha_X = 0.551$" and replace with "$\alpha_H = 0.551$--.

Column 21, Line 56, delete "period (A)" and replace with --period ($\Lambda$)--.

Column 22, Line 49, delete "thermal insulation by A high number" and replace with --thermal insulation by 5.22-fold. A high number--.

Signed and Sealed this
Fourth Day of November, 2025

John A. Squires
*Director of the United States Patent and Trademark Office*